United States Patent
Luo et al.

(10) Patent No.: US 10,701,662 B2
(45) Date of Patent: Jun. 30, 2020

(54) METHODS AND APPARATUS FOR WIDEBAND LOCALIZATION

(71) Applicant: Massachusetts Institute of Technology, Cambridge, MA (US)

(72) Inventors: Zhihong Luo, Berkeley, CA (US); Qiping Zhang, Austin, TX (US); Nicholas Selby, Cambridge, MA (US); Yunfei Ma, Santa Clara, CA (US); Manish Singh, Delhi (IN); Fadel Adib, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/727,727

(22) Filed: Dec. 26, 2019

(65) Prior Publication Data

US 2020/0145959 A1    May 7, 2020

Related U.S. Application Data

(63) Continuation of application No. 16/162,085, filed on Oct. 16, 2018, now Pat. No. 10,575,277.
(Continued)

(51) Int. Cl.
*G01S 5/02* (2010.01)
*H04W 64/00* (2009.01)
(Continued)

(52) U.S. Cl.
CPC ......... *H04W 64/006* (2013.01); *G01S 5/0221* (2013.01); *G01S 5/0278* (2013.01); *H04L 27/265* (2013.01); *H04L 5/0007* (2013.01)

(58) Field of Classification Search
CPC ....... H04W 64/00; H04W 64/006; G01S 5/02; G01S 5/0221; H04L 5/0007
See application file for complete search history.

(56) References Cited

U.S. PATENT DOCUMENTS 6,750,960 B2 * 6/2004 Bowers ............... G01S 17/36
                                                 356/141.4
7,898,419 B2    3/2011 Cristache
(Continued)

OTHER PUBLICATIONS

Azzouzi, S., et al., New measurement results for the localization of UHF RFID transponders using an Angle of Arrival (AoA) approach; published in 2011 IEEE International Conference on RFID, 2011.
(Continued)

*Primary Examiner* — Jinsong Hu
*Assistant Examiner* — Farideh Madani
(74) *Attorney, Agent, or Firm* — Stephen R. Otis

(57) ABSTRACT

A wideband, radio-frequency localization system may estimate the one-dimensional, two-dimensional or three-dimensional position and trajectory of a static or moving object. These estimates may have a high spatial accuracy and low latency. The localization may be determined based on phase or amplitude of a wideband signal in each frequency band in a set of multiple frequency bands. The localization may be based on a single shot of measurements across a wide band of radio frequencies, without frequency hopping. The measurements of the wideband signal may be taken over time and over space at multiple receivers. The localization may be based on measurements taken while a backscatter node remains in a first reflective state or in a second reflective state, rather than when the backscatter node is transitioning between reflective states. In some cases, the localization achieves sub-centimeter spatial resolution in each of three spatial dimensions.

15 Claims, 8 Drawing Sheets

Related U.S. Application Data

(60) Provisional application No. 62/582,949, filed on Nov. 8, 2017.

(51) Int. Cl.
*H04L 27/26* (2006.01)
*H04L 5/00* (2006.01)

(56) References Cited

U.S. PATENT DOCUMENTS

| | | | |
|---|---|---|---|
| 9,043,992 | B2 | 6/2015 | Viikari et al. |
| 2003/0052813 | A1 | 3/2003 | Natsume |
| 2006/0261951 | A1 | 11/2006 | Koerner et al. |
| 2007/0115137 | A1 | 5/2007 | Lyon et al. |
| 2007/0285245 | A1 | 12/2007 | Djuric et al. |
| 2009/0212921 | A1 | 8/2009 | Wild et al. |
| 2010/0309017 | A1* | 12/2010 | Ramchandran ......... G01S 3/74 340/8.1 |
| 2011/0309969 | A1* | 12/2011 | Gravelle ............... G01S 13/751 342/130 |
| 2013/0285750 | A1 | 10/2013 | Chowdhury et al. |
| 2016/0097837 | A1* | 4/2016 | Richley ................ G01S 5/0215 342/465 |
| 2019/0141666 | A1* | 5/2019 | Luo ..................... H04W 64/006 |

OTHER PUBLICATIONS

Bouet, M., et al., RFID tags: Positioning principles and localization techniques; published in 2008 1st IFIP Wireless Days.

Bouet, M. et al., A range-free 3-D localization method for RFID tags based on virtual landmarks; published in IEEE 19th International Symposium on Personal, Indoor and Mobile Radio Communications, 2008. PIMRC 2008.

Chawla, K., et al., Real-time RFID localization using RSS; published in 2013 International Conference on Localization and GNSS (ICL-GNSS), 2013.

Denk, W., et al., Two-photon laser scanning fluorescence microscopy; published in Science, vol. 248, No. 4951, pp. 73-76, Apr. 1990.

Helmchen, F., et al., Deep tissue two-photon microscopy; published in Nature Methods, vol. 2, No. 12, pp. 932-940, Dec. 20005.

Karmakar, N., et al., Chipless RFID Tag Localization; published in IEEE Transactions on Microwave Theory and Techniques, vol. 61 Issue 11, Nov. 2013.

Kronberger, R., et al., UHF RFID localization system based on a phased array antenna; published in 2011 IEEE International Symposium on Antennas and Propagation (APSURSI), 2011, pp. 525-528.

Ma, Y. et al., 3D real-time indoor localization via broadband nonlinear backscatter in passive devices with centimeter precision; published in Proceedings of the 22nd Annual International Conference on Mobile Computing and Networking MobiCom '16, pp. 216-229, Oct. 2016, ACM.

Ni, L., et al. Landmarc: indoor location sensing using active RFID; published in Proceedings of the First IEEE International Conference on Pervasive Computing and Communications, 2003. (PerCom 2003).

Pelissier, M., et al., A 112 Mb/s Full Duplex Remotely-Powered Impulse-UWB RFID Transceiver for Wireless NV-Memory Applications; published in IEEE Journal of Solid-State Circuits; Year 2011, vol. 46, Issue 4, pp. 916-927.

Shangguan, L., et al., The Design and Implementation of a Mobile RFID Tag Sorting Robot; published in MobiSys 16, Proceedings of the 14th Annual International Conference on Mobile Systems, Applications, and Services pp. 31-42.

Yang, L., et al., Tagoram: real-time tracking of mobile RFID tags to high precision using COTS devices; published in MobiCom '14 Proceedings of the 20th annual international conference on Mobile computing and networking pp. 237-248, Sep. 2014.

Yang, Z., et al., NICScatter: Backscatter as a Covert Channel in Mobile Devices; published in MobiCom '17 Proceedings of the 23rd Annual International Conference on Mobile Computing and Networking, pp. 356-367, —Oct. 2017.

Zhou, C., et al., Accurate Phase-Based Ranging Measurements for Backscatter RFID Tags; published in IEEE Antennas and Wireless Propagation Letters; Year 2012, vol. 11, pp. 152-155.

Zhou, J., et al., RFID localization algorithms and applications—a review; published in Journal of Intelligent Manufacturing; vol. 20, Issue 6, (Dec. 2009), pp. 695-707.

Zhou, J., et al., Two-dimension localization of passive RFID tags using AOA estimation; published in 2011 IEEE Instrumentation and Measurement Technology Conference (I2MTC), 2011.

\* cited by examiner

Input: Distance estimations: $y_{0:T}$
Initialization: At time $t = 0$

Compute mixture of Gaussian function $q_0(x_0; y_0)$
        (a) Prune unlikely intersection points of $y_0$
        (b) Linearize unpruned tuples as Gaussians per Eq. 4
        (c) Approximate Gaussians per Eq. 5
        (d) Assign weights to tuples per Eq. 6
    Sample and assign weights
        For $i = 1, \ldots, N$:
            (a) Sample $x_0^{(i)}$ from $q_0(x_0; y_0)$
            (b) Assign weights: $\hat{w}_0^{(i)} = p(y_0 \mid x_0^{(i)})$
    Normalize weights: $w_0^{(i)} = \hat{w}_0^{(i)} / \sum_{j=0}^{N} \hat{w}_0^{(j)}$

Iteration:
For time $t = 1, \ldots, T$
    For $i = 1, \ldots, N$:
        Compute Gaussian function $q^{(i)}(x_t; y_t)$
        (a) Identify closest tuple $s^{(i)}$
        (b) Approximate $q^{(i)}(x_t; y_t) = f(x_t; y_t, s^{(i)})$ Sample and assign weights
        For $i = 1, \ldots, N$:
            (a) Sample $x_0^{(i)}$ from $q_0(x_0; y_0)$
            (b) Assign weights: $\hat{w}_0^{(i)} = p(y_0 \mid x_0^{(i)})$
    Normalize weights: $w_0^{(i)} = \hat{w}_0^{(i)} / \sum_{j=0}^{N} \hat{w}_0^{(j)}$

FROM
FIG. 11A

Iteration:
For time $t = 1, ..., T$
    For $i = 1, ..., N$:
        Compute Gaussian function $q^{(i)}(x_t;y_t)$
            (a) Identify closest tuple $s^{(i)}$
            (b) Approximate $q^{(i)}(x_t;y_t) = f(x_t; y_t, s^{(i)})$
        Sample and assign weights
            (a) Sample $x_t^{(i)}$ from $$\pi(x_t \mid x_{t-1}^{(i)}, y_{0:t}) \propto p(x_t \mid x_{t-1}^{(i)}) q(x_t;y_t)$$

(b) Add to history: $x_{0:t}^{(i)} = (x_{0:t-1}^{(i)}, x_t^{(i)})$ (c) Assign weights:

$$\hat{w}_t^{(i)} = w_{t-1}^{(i)} \frac{p(y_t \mid x_t^{(i)}) p(x_t^{(i)} \mid x_{t-1}^{(i)})}{\pi(x_t^{(i)} \mid x_{t-1}^{(i)}, y_{0:t})}$$

Normalize weights: $w_t^{(i)} = \hat{w}_t^{(i)} / \sum_{j=0}^{N} \hat{w}_t^{(j)}$ Compute effective sample size $\widehat{N_{\mathit{eff}}}$.
If $\widehat{N_{\mathit{eff}}} < N_{\mathit{thres}}$, resampling based on $w_t^{(i)}$

Output: MAP Trajectory: $x_{0:T}^* = \arg\max_{\{x_{0:t}^{(i)}, w_{0:t}^{(i)}\}} w_{0:t}^{(i)}$

FIG. 11B

METHODS AND APPARATUS FOR WIDEBAND LOCALIZATION

RELATED APPLICATIONS

This application is a continuation of U.S. application Ser. No. 16/162,085 filed on Oct. 16, 2018, which claims the benefit of U.S. Provisional Application No. 62/582,949 filed Nov. 8, 2017 (the "Provisional").

STATEMENT REGARDING FEDERALLY SPONSORED RESEARCH OR DEVELOPMENT

This invention was made with Government support under Grant No. CNS1739723 awarded by the National Science Foundation (NSF). The Government has certain rights in the invention.

SUMMARY

In illustrative implementations of this invention, a localization system ("LS") detects 1D, 2D, or 3D position of a backscatter node or other object with high spatial accuracy and low latency. For instance, the LS may be employed to detect the 3D position of a moving object, and thus may facilitate fine-grained robotic tasks. The LS may localize backscatter nodes with sub-centimeter accuracy without constraints on their locations or mobility. The LS may extract a sensing bandwidth from every single backscatter packet that is three orders of magnitude larger than the backscatter communication bandwidth.

In illustrative implementations, the LS employs a Bayesian space-time super-resolution algorithm that combines time series of the sensed bandwidth across multiple antennas to enable accurate positioning. In a prototype of this invention, the LS simultaneously achieves a median accuracy of sub-centimeter in each of the x/y/z dimensions and a 99th percentile latency of less than 7.5 milliseconds in 3D localization. In tests of this prototype, the LS achieved fine-grained positioning for agile robotic tasks, including in use scenarios with robotic arms and nanodrones and for indoor tracking, packaging, assembly, and handover.

In some implementations of this invention, an LS performs RF-based identification and 3D localization for fine-grained robotic tasks. In some implementations, the LS achieves at least three technical goals: (i) spatial accuracy, (ii) ability to detect moving RFIDs, and (iii) scalability.

Accuracy: In illustrative implementations of this invention, the LS achieves sub-centimeter localization accuracy. This localization accuracy may facilitate agile manipulation tasks, such as grasping and packaging. For instance, this localization accuracy may enable a robot to align its grip with an object for item grasping and manipulation tasks.

Mobility: In illustrative implementations of this invention, an LS tracks position and trajectory of a moving object with very low latency. As a result, the LS may be fast enough to track mobile objects that are moving in random mobility patterns, and thus may facilitate spatially precise manipulation of objects by a robotic arm.

Scalability: In illustrative implementations, an LS system may employ inexpensive hardware (such as inexpensive RFID tags). Thus, the LS may cost-effectively scale to hundreds or thousands of items, even in relatively confined areas like homes or small businesses.

To the inventors' knowledge, no conventional system exists today that achieves all three of these technical goals simultaneously. On one hand, WiFi®-based and Bluetooth®-based solutions are not scalable in our context since it is not feasible or cost-effective to tag every item with a Bluetooth® or WiFi Radio®. On the other hand, billions of manufactured items are already tagged with few-cent RFIDs, making RFID-based localization attractive from a scalability standpoint. However, conventional RFID localization solutions may be limited either in their accuracy or in their ability to deal with mobility. Conventional RFID techniques such as Tagoram and RFIDraw may work with mobile RFIDs, but they have decimeter-scale accuracy in obtaining a tag's exact position. (These techniques may track changes in distance so they may accurately recover the shape of a trajectory, but may have relatively low accuracy in obtaining exact position). This prevents using these conventional RFID techniques for tasks such as grasping or manipulation. Other conventional RFID techniques such as MobiTagBot and RFCompass achieve high accuracy but require the tag to remain static for multiple seconds as they perform their localization; this prevents them from tracking nanodrones or enabling agile tasks where a robot needs to move and manipulate the object of interest simultaneously.

In illustrative implementations of this invention, an LS performs RF localization that achieves all three of the above goals. In some implementations, the LS has at least two technical innovations that together allow it to achieve high accuracy and random mobility.

One-Shot Wideband Estimation: In some implementations, the LS estimates an RFID's response over a wide bandwidth—e.g., one that is at least three orders of magnitudes larger than the backscatter communication bandwidth. The large bandwidth may be employed to mitigate reflections from other objects in the environment and to isolate the RFID's response. The LS may estimate the wide bandwidth in one shot from every single RFID response. The LS may include a wideband localization helper which acts like a radar. The helper may transmit a wideband signal, and may measure its reflection off different objects in the environment, including an RFID tag. The LS may transmit the helper's wideband signal in such a way that the wideband signal is compatible with the RFID tag's protocol, and may synchronize the helper with an RFID reader to isolate the RFID's reflection and estimate its wideband channel from every single response. In tests of a prototype of this invention, the one-shot estimation enables accurate and precise positioning at speeds where conventional systems fail.

In some cases, the LS employs a wideband of sensing frequency—e.g., a sensing bandwidth that is greater than 10 MHz, or greater than 50 MHz, or greater than 100 MHz, or greater than 200 MHz.

Bayesian Space-Time Super-Resolution: Unfortunately, with conventional localization methods, the bandwidth that may be estimated from an RFID tag remains limited by the RFID tag's antenna response and impedance matching circuitry. As a result, the ability to sense an RFID's channel with conventional localization methods significantly degrades beyond a couple hundred MHz, even if the conventional method performs frequency hopping. Such bandwidth is still an order of magnitude lower than that required for sub-centimeter localization using ultra-wideband techniques.

In illustrative implementations of this invention, an LS performs a space-time super-resolution algorithm that overcomes this challenge. This localization algorithm may employ a wide bandwidth of frequencies (e.g., more than 100 MHz) to narrow down the potential locations of an RFID tag to a handful of candidates. By combining these candidates over space (multiple antennas) and time, the LS may zoom in on the exact location. In illustrative implementations, the localization algorithm may solve a Gaussian mixture problem and incorporate it into a Bayesian framework that fuses spatio-temporal bandwidth measurements. Further, to deal with the nonlinear nature of the measurements, the LS may perform an approximate inference algorithm that exploits RF and geometric properties of the underlying estimators to achieve a computationally efficient solution for highly accurate positioning.

In a prototype of this invention, the LS includes USRP (universal software radio peripheral) X310 software radios and detects the position and trajectory of off-the-shelf, battery-free RFID tags. In a test of this prototype, over a million location measurements demonstrate that the LS may achieve sub-centimeter localization accuracy in each of the x/y/z dimensions. In this test, the LS's 99th percentile accuracy remains lower than 2 cm in each of the x/y/z dimensions, while retaining a 99th latency smaller than 7.5 milliseconds in 3D localization. In a test of this prototype, the LS: (a) accurately tracked collaborative tasks between robotic arms including packaging, handover, and assembly; and (b) accurately tracked nanodrones as they flew in indoor environments.

In some implementations of this invention, an LS performs one-shot wideband estimation from every backscatter packet, enabling low-latency and high-precision localization. The LS may perform a spatio-temporal Bayesian framework for RF localization that fuses time series of bandwidth and phase measurements across multiple antennas. The LS may perform an approximate inference algorithm with fast convergence time for RF localization. The algorithm may achieve computational efficiency by incorporating the properties of RF signals and the geometric nature of its measurements.

Practical applications: In some use scenarios of this invention, an LS tracks position and trajectory of objects while the objects are manipulated by robotic arms, and thus facilitates highly precise robotic manipulation. In some use scenarios, an LS performs full-body motion tracking using battery-free RFID tags for virtual and augmented reality applications. For instance, multiple RFID tags that are positioned on different limbs on a user may be tracked, during full-body tracking. In some use scenarios, the LS performs full-body tracking for rehabilitation, sports analytics, or gaming. The LS may perform an algorithm that take as inputs measurements over a large bandwidth of reflected RF radiation from a backscatter node, enabling sub-centimeter localization accuracy. In some use scenarios, the LS tracks multiple points on the user's body with sub-20-millisecond latency, which is sufficiently fast for VR/AR (virtual reality/augmented reality).

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 11A and 11B together comprise a flowchart of a localization method.

The above Figures are not necessarily drawn to scale. The above Figures show some illustrative implementations of this invention, or provide information that relates to those implementations. The examples shown in the above Figures do not limit this invention. This invention may be implemented in many other ways.

DETAILED DESCRIPTION

Overview

In illustrative implementations of this invention, an LS performs ultra-low latency, very high accuracy localization of backscatter sensors. This localization, in turn, may facilitate fine-grained robotic applications. In illustrative implementations, the LS accurately performs localization both in line-of-sight and through occlusions. In some implementations: (a) the LS operates with inexpensive backscatter sensors such as off-the-shelf RFID tags without hardware modifications to the tags; and (b) is fully compatible with a standard UHF RFID protocol. The backscatter sensor (e.g., RFID tags) may be attached as stickers to objects of interest (e.g., manufacturing items) for object manipulation or may be affixed to miniature robots like nanodrones for tracking.

Figure 1A:
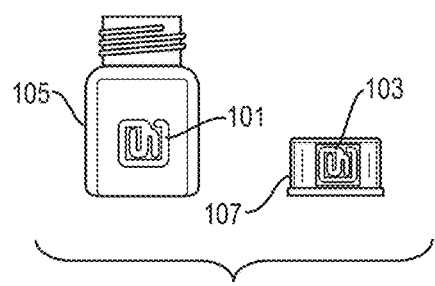
FIG. 1A shows a bottle and bottle cap, each with an RFID tag attached.
Figure 1B:
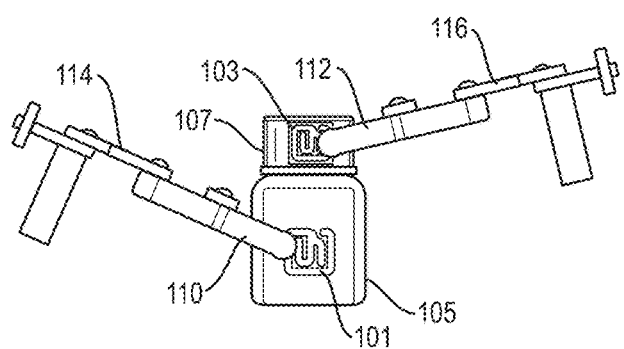
FIG. 1B shows robotic arms screwing the bottle cap unto the bottle.
Figure 1C:
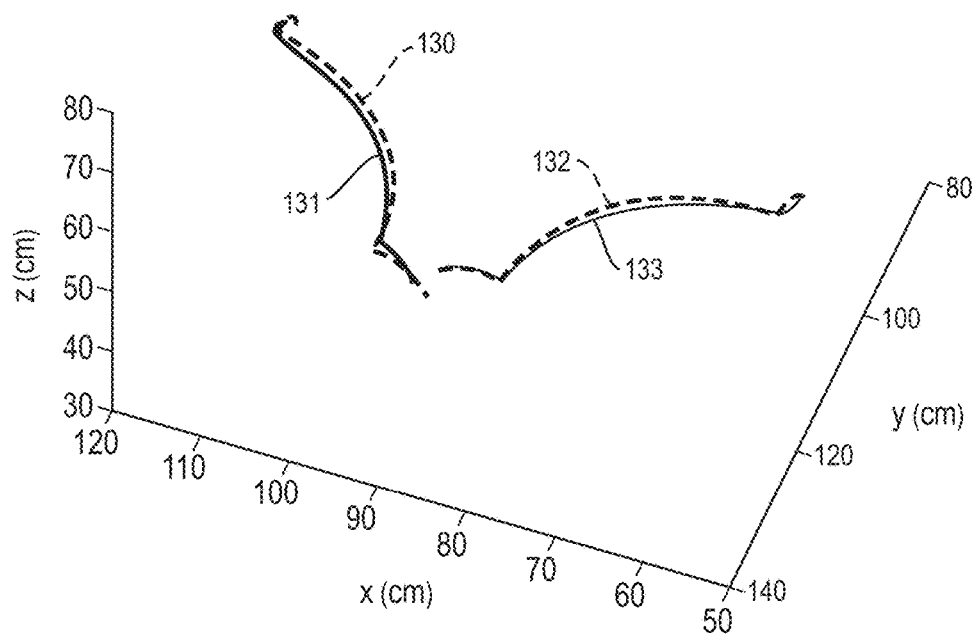
FIG. 1C is a chart that shows plots of estimated position and actual position of RFID tags.

FIGS. 1A, 1B, and 1C, taken together, show an illustrative use case of this invention, in which the position of RFID tags is determined with great precision and with very low latency. In FIGS. 1A, 1B and 1C, the objects being robotically manipulated are a bottle and a bottle cap.

FIG. 1A shows a bottle 105 and a bottle cap 107. RFID tag 101 is affixed to bottle 105 and RFID tag 103 is affixed to cap 107.

FIG. 1B shows robotic arms 114, 116 screwing the bottle cap 107 unto the bottle 105. The robotic arms include pincers 110, 112 that grasp the bottle cap 107 bottle 105. The robotic manipulation shown in FIG. 1B may be enabled by precise, low latency localization of the RFID tags 101, 103 in accordance with the present invention.

FIG. 1C is a chart that shows plots of estimated position and actual position of RFID tags. FIG. 1C plots: (a) actual trajectory 130 of RFID tag 101 on bottle 105; (b) estimated trajectory 131 of RFID tag 101 on bottle 105; (c) actual trajectory 132 of RFID tag 103 on bottle cap 107; and (d) estimated trajectory 133 of RFID tag 103 on bottle cap 107. In FIG. 1C, the estimated trajectories were estimated by a prototype of this invention. As may be seen from FIG. 1C, this invention may estimate position with sub-centimeter precision.

Figure 2:
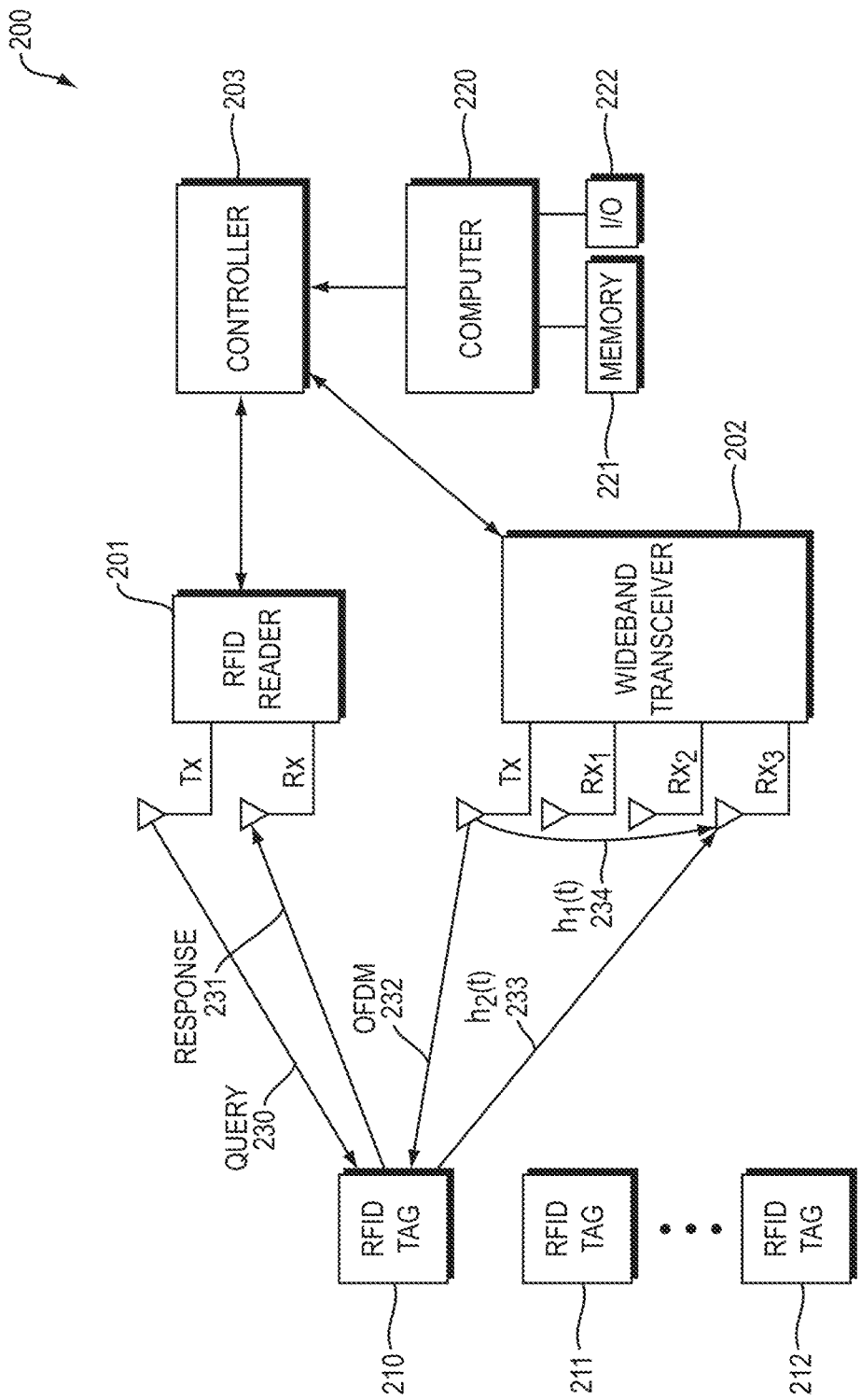
FIG. 2 shows hardware for precisely determining the position of one or more RFID tags.

FIG. 2 shows hardware 200 for precisely determining the position of one or more RFID tags, in an illustrative implementation of this invention. In the example shown in FIG. 2, a transmit (Tx) antenna of an RFID reader 201 transmits a query 230 to a RFID tag 210. Tag 210 reflects a modulated response 231 to a receiver (Rx) antenna of RFID reader 201. A wideband transceiver (sometimes referred to herein as a "localization helper") 202 transmits, via one or more transmit antennas, OFDM symbols 232 to RFID tag 210. In FIG. 2, each OFDM symbol includes multiple orthogonal subcarriers in different frequency bins, where the highest frequency of the highest frequency subcarrier is much greater than the lowest frequency of the lowest frequency subcarrier. For instance, the difference between these highest and lowest frequencies may be greater than or equal to 10 MHz, or greater than or equal to 50 MHz, or greater than or equal to 100 MHz, or greater than or equal to 200 MHz.

In FIG. 2, a controller computer 203 controls and interfaces with the RFID reader 201 and wideband transceiver 202. For instance, controller 203 may comprise a microcontroller.

Optionally, an additional computer 220 may control and interface with controller 203. Computer 220 may store data in, and access data stored in, a memory device (e.g., 221). Likewise, controller 203 may store data in, and access data stored in, a memory device. A human user may input data or instructions to computer 220—and may receive outputted data from computer 220—via one or more I/O (input/output) devices 222. For instance, the one or more I/O devices 222 may comprise any combination of one or more display screens, touch screens, keyboards, computer mice, microphones, speakers, earbuds, earphones, projectors, and haptic transducers.

In some cases, controller 203 or computer 220 controls transmission of RF signals by reader 201 and by wideband transceiver 202 (or performs post-processing of measurements of received RF signals) in such a way that location of RFID tag 210 is estimated based on measurements that are taken while RFID tag 210 is in a first reflective state or is in a second reflective state and that are not taken while RFID tag 210 is transitioning between the first and second reflective states. In some cases, RFID tag 210 may be more reflective of RF radiation during the first reflective state than during the second reflective state, or may reflect RF radiation at a different phase during the first reflective state than during the second reflective state.

In some cases, changes in the reflective state of RFID tag 210 are caused by changes in impedance of the RFID tag 210. The RFID tag may switch rapidly between: (a) a more reflective state and (b) a less reflective state. In the more reflective state, a switch in the RFID tag may be closed, causing the tag's antenna to be connected to ground, impedance in a circuit that includes the tag's antenna to be zero (or close to zero), and more RF power to be reflected by the tag's antenna. In the less reflective state, the switch in the RFID tag may be open, causing RF power to flow into the tag's power harvesting unit, impedance in a circuit that includes the tag's antenna to be high, and less RF power to be reflected by the tag's antenna. The switch in the RFID tag that is employed for this modulation (of impedance and reflectivity) may comprise a transistor.

In some cases, the reflective state of a backscatter node (e.g., RFID tag) may vary over time, in such a way that the backscatter node is, at any given time, in either a first reflective state or a second reflective state or is transitioning between the first and second states. The first reflective state may differ from the second reflective state in that a reflection response of the backscatter node is different in the first reflective state than in the second reflective state. The reflection response may be phase or amplitude of RF reflection from the backscatter node as a function of RF radiation incident on the backscatter node In some cases, the impedance (and thus reflective state) of RFID tag 210 is modulated by RFID tag 210 in response to an RFID signal transmitted by RFID reader 201. While reflective state of RFID tag 210 is being modulated (in response to an RFID signal transmitted by RFID reader 201): (a) one or more transmit antennas of wideband transceiver 202 may transmit the OFDM symbols; and (b) modulated OFDM symbols (e.g., $h_2(t)$ 233) may reflect from RFID tag 210 and travel to one or more receive antennas of the wideband transceiver 202 (sometimes called the "localization helper" herein). In some cases: (a) the RFID query 230 and RFID response 231 are in a narrow ISM frequency band (e.g. a 26 MHz ISM band between 902 MHz and 928 MHz); and (b) the OFDM symbols are transmitted in a much wider frequency band (e.g., that has a bandwidth of at least 50 MHz or at least 100 MHz or at least 200 MHz.)

In some cases, each specific receiver antenna of the wideband transceiver 202 receives both (a) a modulated signal (e.g., $h_2(t)$ 233) that reflects from RFID tag 210 and (b) a signal $h_1(t)$ that is travels directly from a transmit antenna of wideband transceiver 202. In illustrative implementations, one or more of reader 201, controller 203 or computer 220 may extract signal $h_2(t)$ 233 received at a particular receiver antenna of the wideband transceiver 202 from the total signal received at that antenna.

In some cases, an LS tracks location of multiple RFID tags (e.g., 210, 211, 212). To do so, RFID reader 201 may perform RFID singulation to detect the identity of each RFID tag based on the tag's uniquely modulated response. The localization of the different RFID tags may be performed in rapid sequence, one RFID tag at a time.

In the example shown in FIG. 2, the system hardware 200 includes an RFID reader 201 and a wideband transceiver (sometimes called a "localization helper" herein) 202. The reader and helper may be employed together to obtain wideband estimates of position of RFID tag 210.

In some implementations, the LS includes an RFID reader and localization helper (also called a wideband transceiver) as shown in FIG. 2. The helper may transmit wideband signals, and may capture their reflections off different objects in the environment. Taken together, the RFID reader and wideband helper may enable both identification (through the RFID's identifier) and accurate localization (using the wideband signals). The LS may include a centralized controller (e.g., 203 in FIG. 2) that (a) synchronizes the helper's signals with the RFID reader at the physical layer; and (b) on the protocol level, incorporates the helper's operation into the reader's finite state machine.

In some implementations, the LS leverages the wideband channel estimates for localization. The LS may fuse estimates across multiple receive antennas of the localization helper and across time through a spatio-temporal Bayesian framework. The LS may model each antenna's measurements as a Gaussian mixture, and may solve for each tag's location and trajectory through an approximate inference algorithm. The approximate inference algorithm may linearize and approximate the antenna measurements in 3D and may propagate their beliefs through a particle filter. In some use scenarios, the resulting accuracy is high enough to enable the LS to track fine-grained robotic tasks.

Figure 3:
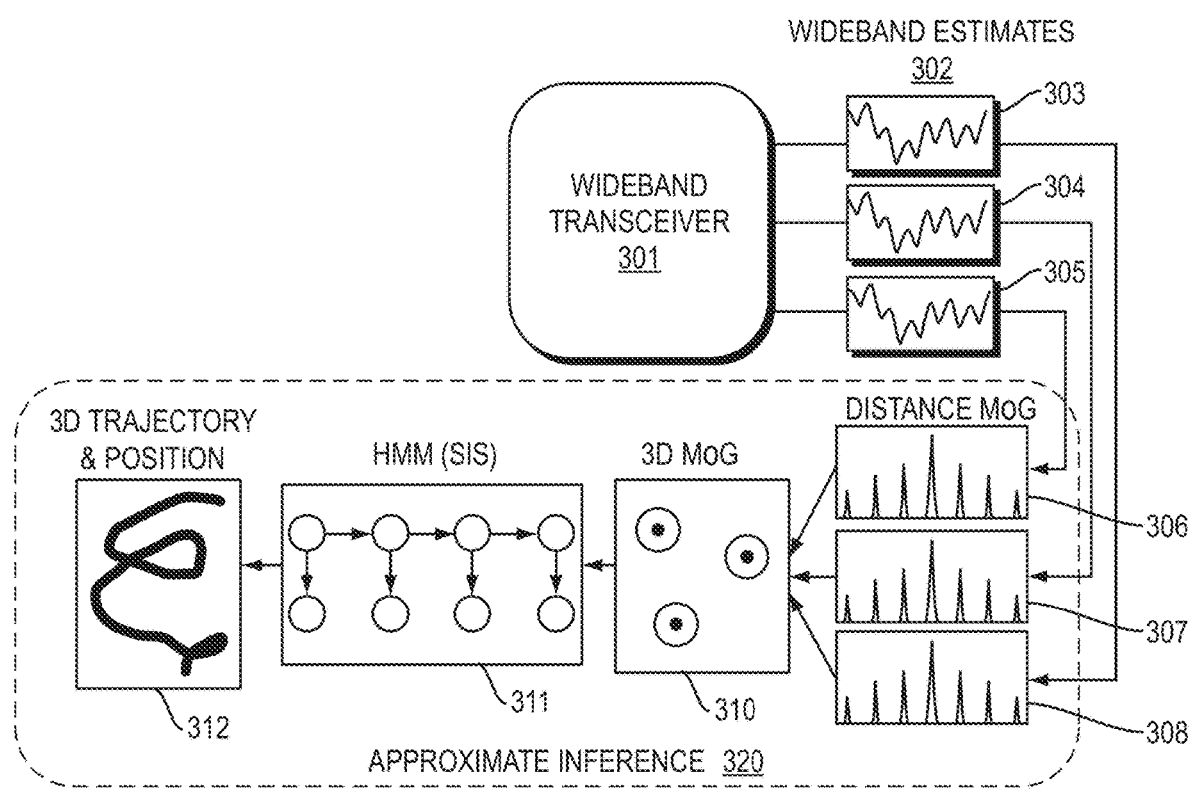
FIG. 3 illustrates a localization method.

FIG. 3 illustrates a localization method. In the example shown in FIG. 3, the method includes: (a) fusing wideband estimates across space and time through a Bayesian framework; and (b) solving for accurate 3D positions of a backscatter node by using approximate inference. In FIG. 3, wideband estimates 302 (including estimates 303, 304, 305) may be derived from measurements taken by a wideband transceiver (sometimes called a "localization helper" herein) 301. In some cases, the wideband estimates are estimates of different subcarriers, each as received at different times or at different antennas or at both different times and different antennas. In some cases, approximate inference 320 is employed to determine localization of a backscatter node. In some cases, the approximate inference algorithm 320: (a) takes, as inputs, the wideband estimates (e.g., 303, 304, 305); (b) models probability distributions of possible distances, by employing mixtures of gaussians ("MoG") (e.g., 306, 307, 308); (c) combines the MoGs into a 3D MoG 310; (d) solves a Hidden Markov Model by employing sequential importance sampling 311, and (e) precisely estimates a 3D trajectory and 3D positions of a moving backscatter node 312.

Figure 4:
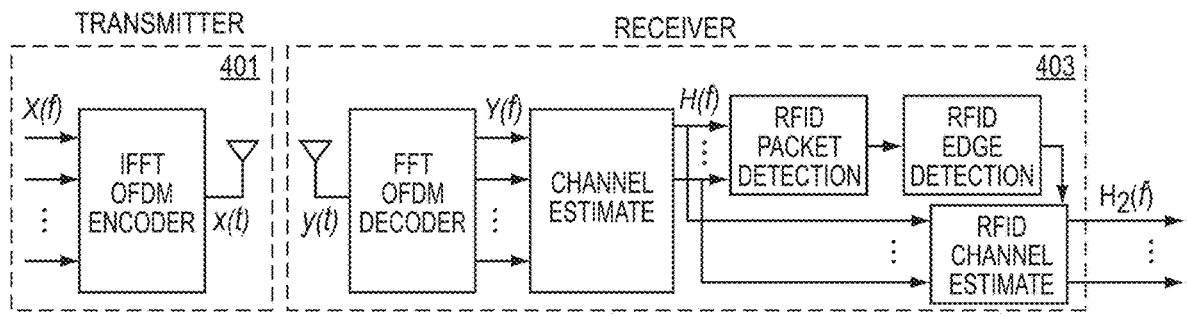
FIG. 4 illustrates one-shot localization with orthogonal frequency-division multiplexing (OFDM).

FIG. 4 illustrates one-shot localization with orthogonal frequency-division multiplexing (OFDM). In the example shown in FIG. 4, a transmitter 401 in a localization helper transmits OFDM symbols. A receiver 403 in the localization helper demodulates these symbols by performing an FFT (fast fourier transform) followed by an overall channel estimation step. In FIG. 4, the overall channel is fed into an RFID packet and edge detection module, in order to discover the RFID's state transitions. Based on the output of the edge detection and elimination block, reliable wideband channel estimates may be extracted.

One-Shot Wideband Estimation

In some implementations of this invention, an LS obtains wideband estimates from every single (narrowband) RFID response. The one-shot estimation enables the LS to track changes in the channel at very high speeds. The LS may employ the wideband estimates for accurate localization.

In backscatter networking, a wireless device called a reader may start a communication session by sending a signal on the downlink. A backscatter sensor (e.g., an RFID tag) may harvest energy from this signal and powers up. To communicate with the reader, the sensor may switch between two states: reflective and non-reflective, to transmit bits of zeroes and ones.

Backscatter modulation may be frequency agnostic: e.g., an RFID tag may modulate not only the reader's signal but also all transmitted signals in the environment. This, in turn, may enable the LS to estimate an RFID's channel out-of-band. In particular, as an RFID backscatters the reader's signal, a wideband transceiver (sometimes called a "localization helper" herein) may transmit an unmodulated wave at another sensing frequency and estimate the RFID's channel at that frequency.

Hopping the sensing frequency across successive RFID responses may emulate a large bandwidth. But such frequency-hopping approaches may query the same RFID tag many times in order to emulate a wide bandwidth. Hence, these frequency-hopping methods: (a) may require the RFID tag to remain static; and (b) may reduce the RFID reader's throughput and increase the latency of tracking.

A technical problem which the inventors solved is: How to estimate a wide bandwidth in a single shot, e.g., from every single RFID response. In principle, one could do that by simply transmitting a wideband signal from the localization helper simultaneously with the reader, and estimating the channel across its bandwidth. However, this approach is complicated by two technical problems: First, the RFID's switching process introduces a fast fading channel for the wideband signals; ignoring such fading corrupts the wideband estimates. Second, by spreading its transmitted signal over a wide bandwidth rather than a single frequency, the helper's signal-to-noise ratio (SNR) significantly degrades, which limits its ability to detect the RFID's response and precludes channel estimation.

We now describe how the localization helper (of the LS) overcomes these two technical problems. Among other things, we describe how, in some implementations: (a) the helper's wideband signals are transmitted in such a way as to enable backscatter-aware channel estimation; and (b) the RFID tag's response is robustly detected at the wideband receiver and then employed to accurately estimate channels.

Backscatter-Aware Wideband Transmissions

In some implementations of this invention, the LS performs an OFDM (orthogonal frequency division multiplexing) modulation technique. The OFDM modulation may simplify channel estimation over a wide bandwidth.

In some implementations of this invention that employ OFDM, a wideband channel may be divided into a set of multiple narrowband channels, and OFDM modulation may be performed in the frequency domain. As shown in FIG. 4: (a) the OFDM modulator may encode information in the frequency domain as X(f) and then take an IFFT (inverse fast fourier transform) before transmitting the signal over the air; (b) the receiver may demodulate the signal by taking a FFT (fast fourier transform), and may estimate the channel H(f) by dividing the FFT's output by X(f).

Figure 5:
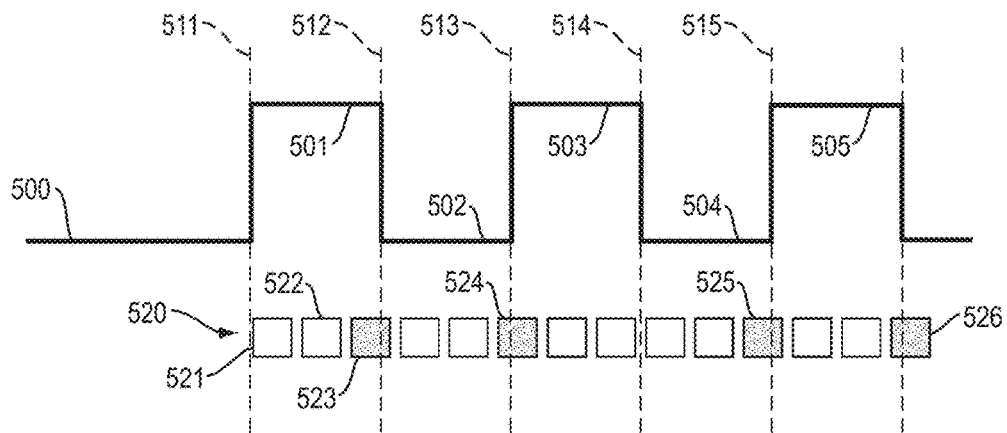
FIG. 5 illustrates selecting OFDM symbols that occur entirely during a period in which a backscatter node is not transitioning between reflective states.

In some implementations, the OFDM symbols are transmitted in such a way that the symbols may be employed with backscatter modulation Consider FIG. 5 which shows an example of both backscatter modulation and the OFDM symbols over time. For accurate OFDM channel estimation, it is desirable that the entire OFDM symbol lies within a channel coherence time (i.e., that the channel does not change during the estimation process). However, as a backscatter node switches its impedance, it causes an extremely fast-fading channel and corrupts the OFDM channel estimate. Hence, if we choose long OFDM symbols, then all of them will be corrupted with the backscatter switching process. On another hand, if we choose very short symbols, we cannot pack many frequencies into them, which would prevent us from estimating the wideband channel at sufficient frequency resolution to deal with frequency selectivity.

To address this challenge and obtain both non-corrupted and fine-grained wideband estimates, the LS may exploit information from the RFID reader about the backscatter switching rate. Specifically, the reader may communicate that rate (called backscatter link frequency or BLF) in its downlink command to the backscatter node. Hence, by coordinating with the RFID reader, the localization helper may use the BLF to construct its OFDM symbols.

To ensure that the channel is not corrupted, an OFDM symbol may be transmitted in such a way that it lies entirely within a specific RFID reflection mode (i.e., transition-free region). To achieve this, the OFDM symbol duration $T_{symbol}$ may be smaller than half the period of an RFID switching period $T_{switching}$:

$$T_{symbol} < \frac{T_{switching}}{2} = \frac{1}{2BLF}$$

Consider the following example, where: (a), an OFDM symbol consists of N samples (i.e., N subcarriers), each with time period $T_{sample}$, and (b) B denotes the overall bandwidth of the helper's OFDM transmission. In this example, to ensure that an OFDM symbol is sufficiently short so that it may occur entirely in a specific RFID reflection mode (i.e., a transition-free region), the LS may employ a number N of samples (OFDM subcarriers) such that $$N < \frac{B}{2BLF}.$$

For example, if the helper's OFDM bandwidth is 100 MHz and the backscatter link frequency is 500~KHz, the LS may employ OFDM where N is less than 100.

Robust Wideband Channel Estimation

Now we discuss how the localization helper may obtain robust channel estimates on the receive side. Recall that a difficulty in wideband estimation arises from the low SNR at each subcarrier since the power is spread across frequencies. This may complicate packet detection and reduce the reliability of the sensed channel.

Robust Packet Detection: In some implementations, to compensate for the reduced power and robustly estimate the beginning of a backscatter packet, the LS exploits a frequency agnostic property of backscatter modulation. In particular, since the different OFDM subcarriers undergo the same backscatter modulation, the LS may incoherently average their estimates. Such averaging may enable the LS to reliably observe changes in the overall reflected power and to use them to detect the beginning of the RFID response. Specifically, for every OFDM symbol at time n, the LS may $$H_{combined}(n) = \sum_f |H(f,n)|$$

compute

Next, the LS may leverage knowledge of the RFID packet's preamble to detect the packet start. Specifically, every RFID packet payload may be preceded by a known preamble p(n). Hence, the localization helper may correlate the averaged channel estimates $H_{combined}(n)$ with the preamble to detect packet start. This correlation may be written as:

$$D(\Delta) = \sum_{n=1}^{T} p^*(n) H_{combined}(n + \Delta)$$

where T is the preamble length and $\Delta$ is the time instance where correlation is performed.

The helper may identify the packet beginning when D rises above a threshold.

Edge Flip Elimination: Next, the LS may eliminate corrupted OFDM symbols. Recall the LS may construct the OFDM symbols to accommodate for the backscatter reflection rate. While this may ensure that at least one whole symbol is in a reflective or non-reflective state, it does not ensure that all OFDM symbols are non-corrupted.

By leveraging knowledge from the previous step—namely when an RFID packet starts as well as the RFID's switching frequency—the localization helper may automatically detect and discard erroneous channel estimates. In doing so, the helper may retain only the channel estimates that are obtained when the RFID is reflecting or not reflecting, while eliminating estimates corrupted by RFID state transitions.

FIG. 5 illustrates selecting OFDM symbols that occur entirely during a period in which a backscatter node is not transitioning between reflective states. In the example shown in FIG. 5, a modulated signal 500 reflects from a backscatter node. During time intervals 501, 503, 505, the backscatter node is in a first reflective state. During time intervals 502, 504, the backscatter node is in a second reflective state. The backscatter node may be more reflective (and thus amplitude of modulated signal 500 is greater) during the first reflective state than during the second reflective state. At edges 511, 512, 513, 514, 515, the backscatter node may transition between the first and second reflective states. In FIG. 5, the OFDM symbols 520: (a) are each shorter in duration than a single time interval (e.g. 501, 503, 505) throughout which the backscatter node remains in the first reflective state; and (b) are each shorter than a single time interval (e.g. 502, 504) throughout which the backscatter node remains in the second reflective state. For instance, the duration of each OFDM symbol may be shorter than one half of the multiplicative inverse of the backscatter link frequency of the backscatter node. Because of the short duration of each of the OFDM symbols, at least a subset of the OFDM symbols may occur entirely during a period in which a backscatter node is not transitioning between reflective states. For instance, OFDM symbols 521 and 522 may each occur entirely during period 501 while the backscatter node remains in the first reflective state. Edge transitions (e.g., 511, 512, 513, 514, 515) may occur during a subset of the OFDM symbols (e.g., during OFDM symbols 523, 524, 525, 526) and may corrupt channel estimates of these OFDM symbols. These corrupted channel estimates may be disregarded when computing position or trajectory of the backscatter node. Alternatively, the OFDM symbols may be transmitted only at times such that (a) each of the transmitted OFDM symbols occurs entirely in a first reflective state or in the second reflective state; and (b) an edge transition does not occur during any of the transmitted OFDM symbols.

RFID tags may communicate by switching between reflective and non-reflective states. In some implementations, the localization helper constructs and decodes its OFDM symbols to accommodate the backscatter switching.

Channel Estimation: In some implementations, the LS estimates the RFID channels at each of the subcarriers. Note that the OFDM channel estimates H(f) comprise not only the RFID's reflection but also the direct path between the helper's transmit and receive antennas as well as other reflections in the environment. To estimate the RFID's channel, the LS may exploit the fact that the difference between the reflective and non-reflective states is due to the RFID, and may subtract them from each other to obtain the RFID's channel.

Specifically, assume that after discarding the erroneous channel estimates from the preamble, the helper is left with L symbols where the RFID is non-reflective and M symbols where it is reflective. The channels may be estimated at each subcarrier f as:

$$\hat{H}_i(f) \propto \frac{1}{L}\sum^{L} H(f \mid \text{reflective}) - \frac{1}{M}\sum^{M} H(f \mid \text{non-reflective})$$

Note that in the above equation, the average may be calculated based on the reflective states and non-reflective states of a single RFID response, enabling one-shot wideband estimation.

To improve the efficiency of the wideband estimation process, the localization helper may be taken into account in the finite state machine (FSM) of the RFID reader. This, in turn, may enable the localization helper to perform the OFDM-based demodulation over only the short interval of time during which the RFID's response is expected, rather than over the entire duration of the reader's communication session. Specifically, the receiver may open a short time window immediately after the reader finishes transmitting its query command. For instance, this window may be 300 μs-long in comparison to the 2 ms-long communication session. As a result, this synchronous architecture may save significant computational resources (e.g., by 6.6×), allowing the LS to achieve ultra-high frame rates and ultra-low latency.

In some cases: (a) the helper's transmitter and receiver are connected to the same oscillator; and (b) thus the estimated channels do not have any carrier frequency offset (CFO) or sampling frequency offset (SFO).

In some cases: (a) the helper transmits the same OFDM symbol back-to-back to estimate the channel; and (b) thus each OFDM symbol may act as a cyclic prefix for the subsequent one.

In some cases: (a) the helper's transmit and receive antennas are co-located; (b) the line-of-sight signal dominates the channel estimate, and (c) sampling offset (or packet detection delay) between the transmitted and received OFDM symbols is minimal or non-existent.

To correct for any sample offsets introduced by the hardware channel, the LS may perform a time-domain correlation that detects the beginning (i.e., first sample) of the first OFDM symbol. Moreover, the LS may perform a one-time calibration with a known RFID location in order to eliminate other over-the-wire hardware channels.

The localization helper may drop the DC subcarrier because the DC subcarrier is less robust to noise, and because dropping the DC subcarrier may improve the dynamic range of the ADC (Analog-to-Digital Converter).

To further improve its signal-to-noise ratio (SNR), the LS may employ an Exponential Moving Average (EMA) on the channel estimates. The EMA may provide more robust channel estimates without sacrificing mobility. This may enable the LS to achieve higher accuracy.

Bayesian Space-Time Super-Resolution

So far, we have discussed how an LS may estimate an RFID tag's channel over a wide bandwidth. In this section, we describe how the L may employ this wide bandwidth to estimate and track an RFID's 3D location.

Bootstrapping Localization

Before we describe the LS's localization algorithm, we start by analyzing whether backscattering a large bandwidth would be sufficient for precise localization.

In principle, if one could backscatter a very large bandwidth off an RFID, then one could directly use that bandwidth to localize the tag in a manner similar to conventional ultra-wideband (UWB) ranging systems. In particular, conventional UWB systems leverage their large bandwidth to compute the time-of-flight—i.e., the time it takes their signals to travel between a transmitter and a receiver. Conventional UWB systems then map this time-of-flight to the distance traveled by multiplying it by the speed of propagation. Because time and frequency are inversely related, the distance resolution is inversely proportional to their bandwidth. The resolution may be expressed as:

$$\text{resolution} = \text{speed/bandwidth}$$

Since RF signals travel at the speed of light, obtaining sub-centimeter resolution using UWB ranging may require a bandwidth of 30 GHz.

Unfortunately, backscattering 30 GHz off RFID tags is neither feasible nor desirable for multiple reasons. First, backscatter devices have antennas and impedance matching circuits that are optimized to harness energy within a specific frequency band. Hence, signals backscattered significantly outside their optimal frequency band have very poor SNR, making channel estimation infeasible. Second, even if one could backscatter such a wide bandwidth off the tags, generating it may require very costly RF radios and processing its reflections may be computationally intensive as it would require processing 30 GS/s.

So how may the LS achieve its desired accuracy without such large bandwidth? One idea to achieve higher accuracy is to leverage the phase of the backscattered signal since it is very sensitive to changes in distances. Specifically, in the noiseless case, we may express the phase φ as:

$$\phi = 2\pi \frac{d}{\lambda} \mod 2\pi$$

where d is the distance traveled and λ is the wavelength.

A difficulty in using the phase, however, is that it wraps around every wavelength. Hence, it allows us to accurately recover a fractional distance $d_{frac}$ modulo the wavelength. Said differently, we would know that the actual distance is $d_{frac}+n\lambda$, but n may be an unknown integer.

In some implementations, the LS obtains a wide bandwidth and the phase from every antenna, and combines them to narrow down the candidate locations to a handful. For example, in some implementations, the LS employs a sensing bandwidth of 100 MHz and a wavelength of 33 cm, and thus has only resolution/λ=9 potential candidate locations for the tag. A question that remains is: which of these locations is the correct one?

Bayesian Formulation

Figure 6:
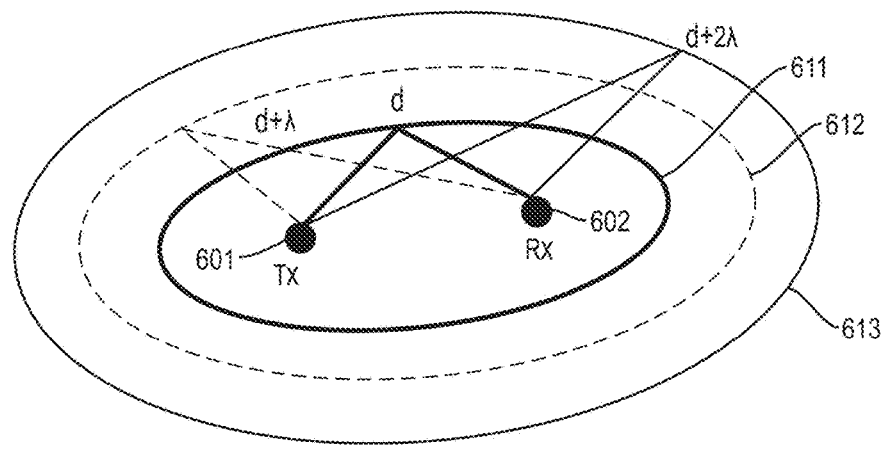
FIG. 6 shows a set of ellipses that are indicative of possible locations of a backscatter node.

In some implementations, the LS employs a Bayesian framework to fuse measurements across space and time:

Space: Spatially, each distance candidate may map to an ellipse whose foci are the transmit and receive antennas. This is because the LS's antennas measure the round-trip distance from the transmitter to the backscatter tag, and back to the receiver. Since a given transmit-receive pair has multiple distance candidates, this leads to multiple confocal ellipses as shown in FIG. 6. Adding more receive antennas would create other sets of ellipses. However, due to noise, we do not expect the correct ellipses from all antennas to intersect at the same point. Thus, in many cases, we do not simply rely on voting to identify the correct candidate.

FIG. 6 illustrates a set of ellipses that are indicative of possible locations of a backscatter node. In FIG. 6, distances map to confocal ellipses. Specifically, in the example shown in FIG. 6: (a) ellipse 611 consists of all points p such that the shortest RF pathlength from transmitter 601 to p and then to receiver 602 is equal to d; (b) ellipse 612 consists of all points q such that the shortest RF pathlength from transmitter 601 to q and then to receiver 602 is equal to d+λ; and (c) ellipse 613 consists of all points r such that the shortest RF pathlength from transmitter 601 to r and then to receiver 602 is equal to d+2λ; where d is a distance calculated from phase and λ is wavelength. In the example shown in FIG. 6, the different pathlengths are each determined based on measured phase, but differ from each other due to phase wrapping (i.e., due to the distance ambiguity that arises from the fact that phase wraps every 2π radians).

Time: Temporally, as the tag moves, each of the candidate locations may trace a different trajectory. An advantage of using temporal series is that because noise is random, we expect the intersection points that correspond to the actual location to be closer to each other across time, providing opportunities to identify them.

Figure 7:
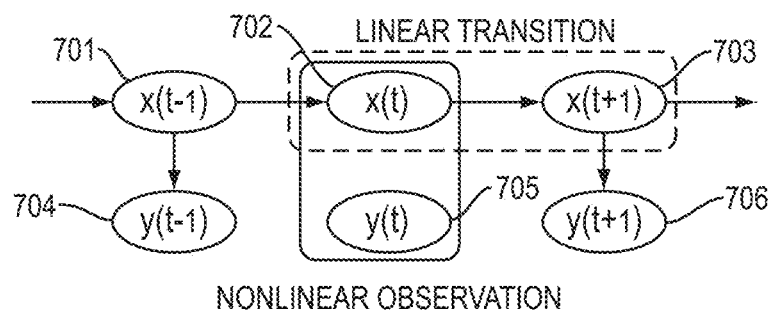
FIG. 7 shows a Hidden Markov Model.

Hidden Markov Model. In some implementations of this invention, the localization problem is formulated as a Hidden Markov Model (HMM), as shown in FIG. 7. HMMs form a class of powerful Bayesian inference models with hidden states and observed variables. In some implementations of this invention, the hidden states correspond to the actual locations of the RFID over time, and the observations are the candidate distances obtained from the different receive antennas.

In some implementations of this invention, the LS's MINI has a nonlinear Gaussian observation model and a linear Gaussian transition model: the distance observations are nonlinear in the state variables (the coordinates) as may be seen with the function, while state transitions are linearly related due to motion. Unfortunately, the nonlinearity may prevent us from adapting common solutions like Kalman Filters to model the distributions.

FIG. 7 illustrates a Hidden Markov Model (HMM), in an illustrative implementation of this invention. In the example shown in FIG. 7, the hidden states are positions of a backscatter node over time. For instance, hidden states 701, 702, 703 are positions x(t−1), x(t), and x(t+1), respectively (that is, the position of the backscatter node at times t−1, t, and t+1). Likewise, in FIG. 7, observed states 704, 705, 706 are measurements y(t−1), y(t), and y(t+1), respectively (that is, measurements at times t−1, t, and t+1). In the HMM, the hidden states may be inferred from the observed states.

In the example shown in FIG. 7: (a) transitions between hidden states 701, 702, 703 may be linear due to motion; and (b) transitions between observed states 704, 705, 706 may be non-linear. In FIG. 7, the observed states (measurements) may be modeled as gaussian related to each other over time.

In some cases, the LS's goal is to find the most likely trajectory $x_1 \ldots x_T$ given the observations (distance candidates) $y_1 \ldots y_T$. To do so, the LS may solve for the maximum a posteriori (MAP):

$$x^*_{0:T} = \underset{x_{0:T}}{\operatorname{argmax}} p(x_{0:T} \mid y_{0:T})$$

where $x_t$ is a d dimensional coordinate vector of the tag, $y_t$ is a k dimensional vector of the estimated distances from each receiver, and p(x|y) denotes the posterior probability distribution.

To solve the above MAP inference problem, a likelihood function $p(y_t|x_t)$ and a prior $p(x_{0:T})$ may be modeled. Per Bayes' rule, the posterior may be expressed as: $p(x_{0:T}|y_{0:T}) \propto p(y_{0:T}|x_{0:T})p(x_{0:T})$.

Next, we describe how the LS may model the likelihood function and prior given the geometric nature of the problem and the underlying wireless properties of the estimators.

The likelihood function may be modeled as follows: Recall that the distance from a given transmit-receive antenna pair may exhibit as multiple candidates. We may formulate the likelihood as a mixture of Gaussian (MoG), where each Gaussian is centered at a different integer wavelength. In particular, given the true distance d, we may approximate the distance estimates $d_{est}$ with the following:

$$z(d_{est} \mid d; \sigma_w) = \sum_{i=-N}^{N} w(i)\mathcal{N}(d + i\lambda, \sigma_w)$$

$$\sum_{i=-N}^{N} w(i) = 1 \qquad \text{(Eq. 1)}$$

where N is determined by the total number of candidates, i is integer wavelength, and $\sigma_w$ corresponds to the standard deviation of Gaussian noise.

The weights w(n) denote the discrete distribution of different integers. For instance, these weights may correspond to the value of the fractional Fourier transform or a MUSIC projection. In some cases: (a) the overall algorithm performance is the same in both cases; and (b) the fractional Fourier is employed because it is less computationally expensive.

The above formulation models the likelihood distribution for one receiver. In some cases, the LS employs multiple receivers, each of which provides a different set of distance estimates. In cases where multiple receivers are employed, estimates from different antennas may be independent, and the overall likelihood $p(y_t|x_t)$ may be a product of those from different receivers:

$$p(y_t \mid x_t) = \prod_{j=1}^{k} z(y_t[j] \mid dist(x_t)[j]; \sigma_w) \qquad \text{(Eq. 2)}$$

where dist: $R^d \to R^k$ returns the round trip distance to the RFID, k denotes the total number of receivers, and j is the index of each receiver.

Transition Model.

Next, we discusses the prior $p(x_{1:T})$. In some cases, the prior is modeled as a Markov time series of the RFID's location, and a simple transition model is employed $$x_t = x_{t-1} v_t, v_t \sim \mathcal{N}(0, \Sigma_v) \qquad \text{(Eq. 3)}$$

where $v_t$'s are i.i.d. Gaussian sequences, accounting for the position changes, and $\Sigma_v$ denotes their standard deviation.

Together, Equations 2 and 3 may form the HMM.

Approximate Inference via Particle Filters

In some cases, due to the nonlinear observation model, the MAP problem is not solved analytically. Instead, in some cases, the LS performs approximate inference solutions, such as particle filters. Instead of propagating beliefs through analytical probability distributions, the LS may employ models that approximate distributions with a set of particles.

We now discuss two technical issues that arise when approximating distributions with particles: (1) how to chose particles so that their discrete distributions accurately represent the analytical distributions; and (2) how to update these particles with new observations (distance candidates)? We describe how the LS may exploit the RF and geometric structures of the RF measurements to develop a computationally efficient solution.

Initial Sampling Function

Conventional particle filters bootstrap the sampling process by populating the entire d-dimensional space with exponentially many particles. In contrast, in some implementations of this invention, the LS leverages its first observation to bootstrap its inference with a relatively small number of particles. In particular, recall that each receive antenna discovers a finite number of distance candidates, which may be mapped to a set of ellipses in 2D as shown in FIG. 6.

To obtain an initial set of particles, one option is to consider all intersection points between ellipses from different antennas. However, this is undesirable for three reasons. First, any such two-way intersection point leaves out important information about distance measurements from other receive antennas. Second, it would result in a polynomially large number of intersection points. Third, such a set of intersection points would not be representative of the distribution as they are sparsely distributed rather than concentrated at the most likely locations.

Instead, in some implementations, the LS identifies the most likely intersection points and then uses them to sample particles that are representative of the distribution. At a high level, the LS may exploit the fact that each antenna's distance measurements may be modeled as a Mixture of Gaussians in order (1) to prune out unlikely candidates, and (2) to linearize the intersection points into a mixture of 2D Gaussians. Subsequently, the LS may sample from a mixture of 2D Gaussians and then adapt the particle weights by importance sampling.

Figure 8:
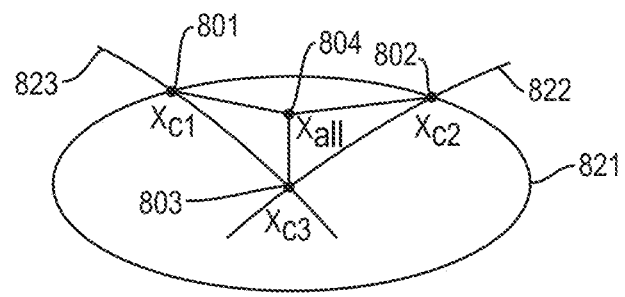
FIG. 8 illustrates centroid approximation.

Step 1: Pruning. In the pruning step, the LS may use the distances between intersection points to identify the most likely candidates. For instance, given a tuple of distance measurements from three antennas, $[d_0, d_1, d_2]$, the LS may calculate three ellipses and identify the three closest intersection points between them as shown in FIG. 8. In an ideal noiseless context, the three closest intersection points would coincide. In a practical, real-world, noisy context, we may expect that the three closest intersection points do not coincide. In some cases, the LS computes the average distance between the three intersection points and discards all intersection points whose average is above a threshold.

Formally, we may denote the intersection points as $\{x_{01}^s, x_{12}^s, x_{02}^s\}$. In some implementations, the LS keeps only tuples in the set $C:=\{s | r(s) \leq T\}$ where $$r(s):=\|x_{01}^s - x_{12}^s\|_2 + \|x_{01}^s - x_{02}^s\|_2 + \|x_{12}^s - x_{02}^s\|_2)$$

In some cases, the tuple s is integer tuple $[s_0, s_1, s_2]$ for $[d_0+s_0\lambda, d_1+s_1\lambda, d_2+s_2\lambda])$.

The preceding paragraphs describe examples in which there are three ellipses and three closest intersection points. Alternatively, any number of ellipses may be calculated and any number of closest intersection points may be identified.

Step 2: Geometric Linearization. In some implementations, the LS approximates each intersection point as a 2D Gaussian using the original distance distributions of the corresponding ellipses. To see why this linearization is possible, consider two intersecting ellipses in FIG. 9, whose intersection point we denote as $x_{01}^s$. Since the noise on the distance measurements is much smaller than the size of the ellipses, the curvature of the ellipses around the intersection point is relatively flat. This allows the LS to approximate the distribution as a 2D Gaussian centered around $x_{01}^s$ and whose axes lie along the normals to the two ellipses at the intersection point.

Formally, if we denote the two axes by the normal vectors: a,b, and define A=[a,b], then the LS may obtain $R_{ij}$ as a Gaussian distribution in the 2D coordinate system:

$$R_{ij} \sim \mathcal{N}\left(x_{01}^s, \sum_{01}^s = AVA^T\right) \text{ s.t. } V = \begin{pmatrix} \sigma_w & 0 \\ 0 & \sigma_w \end{pmatrix} \quad \text{(Eq. 4)}$$

where V denotes the diagonal covariance matrix, which represents the fact that the distance errors from the different antennas are independent.

Figure 9:
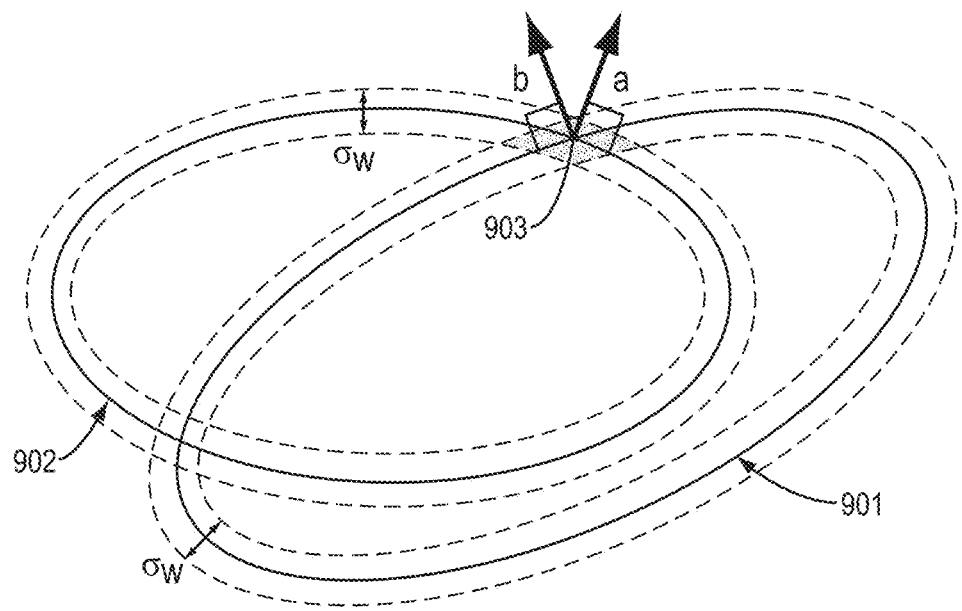
FIG. 9 shows normals at an intersection of ellipses.

FIG. 9 shows normals at an intersection of ellipses. In the example shown in FIG. 9, ellipses 901 and 902 intersect at intersection 903. Normals a and b are normals to ellipses 902 and 901, respectively, at intersection 903. Normals a and b may be treated as two orthogonal axes of a 2D space. The curvature of the ellipses is relatively flat (compared to the noise on distance measurements). Thus, the distribution of probabilities of candidate location may be modeled as a 2D Gaussian that is centered around intersection 903 and that has axes that lie along normals a and b to the two ellipses 901, 902 at intersection 903.

Step 3: Centroid Approximation. So far, the LS may have identified the most likely tuples of intersection points, and linearized each of the intersection points as a 2D Gaussian. Next, in some cases, the LS fuses every surviving tuple into a single candidate. This step is helpful because it may combine measurements from all antennas (while the previous step considered antennas only in pairs). To do so, the LS may approximate any given candidate $x_0$ as the centroid of its three corresponding intersection points (from Step 1). For simplicity, we assume mutual independence between the intersection points, which results in the following Gaussian distribution $f(x_0; y_0, s)$:

$$f(x_0; y_0, s) \sim \mathcal{N}\left(\mu_s, \sum_s\right) \quad \text{(Eq. 5)}$$

$$\mu_s = \frac{1}{3}(x_{01}^s + x_{12}^s + x_{02}^s)$$

$$\sum_s = \left(\frac{1}{3}\right)^2 \left(\sum_{01}^s + \sum_{12}^s + \sum_{02}^s\right)$$

This provides us with a set of 2D Gaussian distributions, each centered at a likely candidate position.

FIG. 8 illustrates centroid approximation. In the example shown in FIG. 8, three ellipses 821, 822, 823 intersect at a total of six intersection points, including a first subset of intersection points 801, 802, 803. This first subset is the three intersection points which are closest to each other. Specifically, the average pairwise distance between intersections in this first subset is less than the average pairwise distance between intersections for any other subset of three intersections (in the set of six intersections). A centroid 804 of the first subset of intersection points 801, 802, 803 may be computed.

The above discussion focuses on 2D localization using three antennas. However, the methods described above generalize to 3D localization with an arbitrary number of antennas. For instance, in the 3D case: (a) ellipsoids may be employed instead of ellipses; and (b) intersections of ellipsoids may be employed instead of intersections of ellipses.

Step 4: Weighting and Initial Sampling. The LS may combine the set of Gaussian distributions into a single 2D mixture of Gaussians. To do so, the LS may assign weights proportional to the product of weights of individual integers to tuples in C. This provides an initial sampling distribution $q_0(x_0;y_0)$:

$$q_0(x_0; y_0) = \sum_{s \in c} \frac{w(s)}{w} f(x_0; y_0, s) \quad \text{(Eq. 6)}$$

$$w(s) = w(s_0)w(s_1)w(s_2), \; w = \sum_{s \in c} w(s)$$

Given this distribution, the LS may efficiently sample a small number of particles $\{x_0^{(i)}\}$ and use them to approximate the distribution. After sampling, the LS may normalize every particle's weight to the total weights.

Figure 10A:
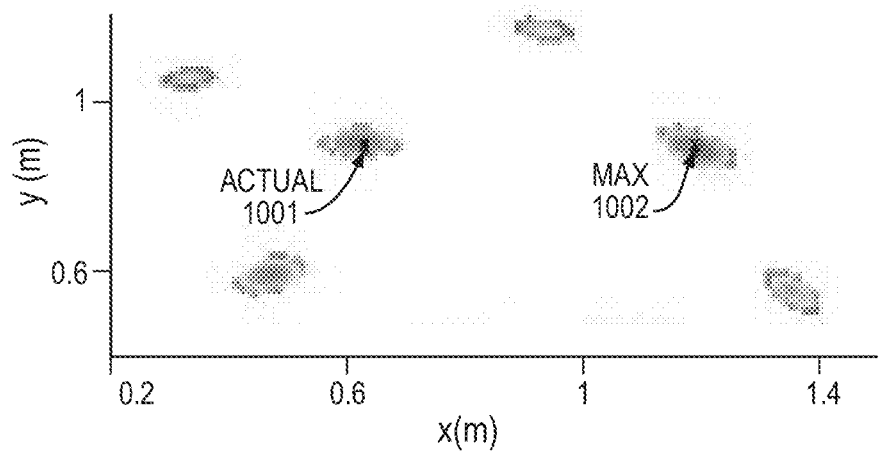
FIGS. 10A and 10B illustrate a particle filter converging on an accurate estimate of location.
Figure 10B:
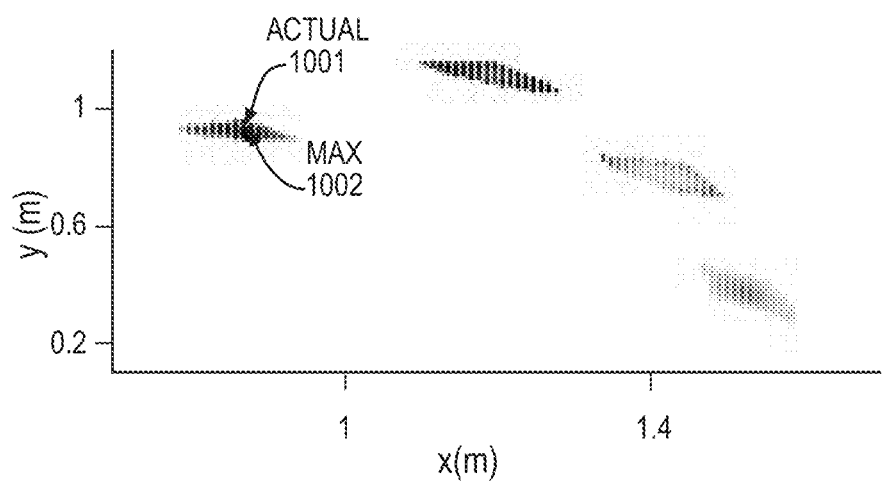

FIGS. 10A and 10B illustrate a particle filter converging on an accurate estimate of location. In FIGS. 10A and 10B, the particles are concentrated in several clusters which correspond to the fused intersection points.

FIG. 10A shows an initial sampling in 2D space. In FIG. 10A, the actual location 1001 is in one of the clusters, but the particle with the highest weight 1002 belongs to another cluster. This shows the power of fusing across antennas but also emphasizes the need to fuse measurements over time.

Over time, the highest weight particle may converge to the correct one. In FIG. 10B, the actual location 1001 and the particle with the highest weight 1002 have converged very close to each other and are located in the same cluster.

As discussed above, the LS may obtain an initial set of particles by fusing RF observations from multiple antennas at a single point in time t=0. In addition, the LS may update its particles through new observations over time. To do so, the LS may employ Sequential Importance Sampling (SIS), a type of particle update filter.

In some implementations of this invention, the SIS may operate through a sequential process. To select representative particles for the probability distribution at some time t, the SIS may use the (new) observations from time t and the probability distribution from the previous state t−1. Hence, for every particle i, it may be optimal to sample from the following distribution $$p(x_t|x_{t-1}^{(i)}, y_t) \propto p(y_t|x_t) p(x_t|x_{t-1}^{(i)})$$

Recall that we have already modeled both terms on the right hand side. In particular, we have modeled $p(x_t|x_{t-1}^{(i)})$ is a Gaussian as per the motion model in Equation 3. Moreover, $p(y_t, x_t)$ may be approximated as a Gaussian as per Equation 5. Because the product of two Gaussians is Gaussian, the overall sampling function may be both Gaussian and approximately optimal. Note that $p(y_t|x_t)$ is a mixture of Gaussians as per Equation 6, but the LS may approximate it to the Gaussian nearest to $x_t^{(i)}$ in the mixture.

In some implementations of this invention, once a sampling distribution for a given particle i is calculated, SIS samples a single particle from that distribution for time t. It may then repeat the same process for all the particles. After obtaining all the samples at time t, it may normalize their weights and then move to the next time step t+1 and repeat the same process.

MAP Inference: For each sampled point in time, the LS may make a decision about the most likely location by choosing the particle with the highest weight. It may also update the past trajectory since every particle may backtrack its entire history. This may allow the LS to continuously update the trajectory with new observations.

Resampling: Even with optimal approximate sampling functions, the SIS algorithm may—unless a corrective step is taken—degenerate to a small number of particles. To avoid degeneracy, the LS may employ a resampling approach. In particular, at every sampled time t, the LS may estimate the effective sample size $$\hat{N}_{ef} = \frac{1}{\sum_{i=1}^{N} (w_t^{(i)})^2},$$

and may resample when the effective sample size is lower than a threshold.

Computational Efficiency: In a sample update step, the LS may exploit the fact that many of the particles i come from the same Gaussian in the Gaussian mixture because they share the same tuple of intersection points. Hence, to optimize computation, the LS may compute the sequential sampling function once for each cluster and reuse it for all particles in that cluster.

Outlier Detection and Recovery: In some cases, wireless interference or strong leakage from multipath occurs. To deal with such scenarios, the LS may employ outlier detection and recovery. For instance, outliers may, in some cases, occur: (a) where the centroid at t is far from that at t−1; or (b) where all particles are assigned near-zero weights, indicating that there is no valid position given current distance estimation. To recover from such outliers, the LS may leverage its high frame rate and interpolate the previous estimates.

FIGS. 11A and 11B together comprise a flowchart of a localization method. In the example shown in FIGS. 11A and 11B, the method employs an approximate inference algorithm.

Prototype

The following 12 paragraphs describe a prototype of this invention.

In this prototype, a localization helper is implemented on USRP X310 software radios, all synchronized to the same external clock. Three USRPs are employed with two UBX daughterboards each. Each USRP may support two chains. In the prototype, one chain is used as a transmitter and four as receivers. Each transmit/receive chain is connected to a circularly polarized patch antenna. All antennas are arranged in a single plane, with a separation of 40 cm between any two adjacent pairs. In the prototype, USRPs sample at 100 MSps and send data over Ethernet to a computer using the Intel® Converged Network Adapter X520-DA2 to support high data rates. The computer runs Ubuntu® 16.04 and has a 4-core 8-thread 64-bit Intel® Core i7 processor and 16 GB RAM.

In this prototype, a USRP RFID reader is implemented on USRP N210 software radios with SBX daughterboards. The reader implements the EPC-Gen 2 RFID protocol. The reader powers up and communicate with the RFID tags, setting various parameters such as the BLF and tag selection in multi-tag scenarios. The reader employs commands so that it only needs to decode the RN16 of the RFIDs of interest; this enables it to skip the ACK and EPC response portions of the communication session and achieve higher frame rates.

In this prototype, the LS performs real-time processing. The localization algorithm is encoded in the USRP's UHD driver in C++. A multi-threaded pipelined architecture with worker pools is employed. On the transmit side, two threads in total are employed: one for the RFID reader and another one for the OFDM transmitter. On the receive side, one thread is employed for extracting buffer-sized packets from the USRPs. In addition, every antenna has a worker pool of two threads; each worker extracts and processes individual RFID responses from the shared buffer, computes and time-stamps the wideband estimates, and feeds them to an output buffer. The threads are aggregated, combining the wideband estimates from all the antennas to perform 3D localization.

In this prototype, the processing runs in real-time, transmitting and receiving OFDM symbols (with N=20 subcarriers), decoding them, estimating the RFID channels, and performing super-resolution and localization.

In a test of this prototype, the prototype tracked the location of commercial, off-the-shelf, battery-free UHF RFID tags. In this test, the prototype was evaluated with multiple types of RFID tags. Because the tags were vertically polarized, the robots were programmed to maintain their orientation to minimize phase changes from orientation changes. Alternatively, circularly polarized tags may be employed to avoid this problem, or an orientation-phase model may be incorporated into the LS's inference algorithm.

In this test, the prototype detected position of RFIDs on three kinds of moving robots. For 2D evaluation, an RFID was attached to a cleaning Roomba® robot. For 3D evaluation, an RFID was attached to an item carried by LeArm 6DoF robotic arms and to Potensic® A20 minidrones.

In this test, the prototype was evaluated in a standard office building, fully furnished with tables, chairs, computers. The prototype was tested in both line-of-sight (LOS) and non-line-of-sight (NLOS) settings. The NLOS testing was performed by blocking the visible LOS path between an RFID tag and the prototype's antenna using standard office cubicle dividers made of wood.

In this test, the prototype's localization accuracy was tested in LOS and NLOS settings. Five thousand experimental trials were performed, each lasting between 30 seconds and one minute. This allowed more than 20 million location measurements to be collected. In each trial, different arbitrary movements were performed with the robotic arm or the drone carrying the RFID. The tracking error was computed as the difference between the prototype's location estimate and ground truth as determined by an OptiTrack® optical tracking system.

In this test, the prototype achieved a median error of less than 1 cm and a 90th percentile error of less than 2 cm in each dimension.

In this test, the latency of the prototype was evaluated for both 2D and 3D localization. Our 2D trials were performed using an RFID attached to a Roomba® robot. The latency was computed as the time difference between the time the USRP obtains an RFID response and the time it outputs a location. The time-of-flight of the wireless signal was ignored (for purposes of evaluating test results) since it is only few nanoseconds for the distances of testing (few meters) hence negligible for our latency measurements. The test results show that the 99th percentile latency measurements for 2D and 3D tracking by the prototype are 6.6 cms and 7.3 ms, respectively. This latency is primarily limited by the processing time of the computer rather than the latency of the RFID's response or acquisition. Specifically, in both the 2D and 3D experiments, the prototype's receivers all obtain the RFID responses at the same time, yet the difference in latency may be due to the difference in processing speed. Across these experiments, the prototype achieved a frame rate of 300 frames/second in both 2D and 3D localization. This high frame rate may owe to the prototype's pipelined architecture which decouples the frame rate from the latency, enabling it to achieve both high frame rates and low latency.

The prototype's high accuracy, low latency, and high frame rate enable it to track objects in continuous motion. This ability to track an object in continuous motion is helpful for robotic manipulation and tracking tasks.

In a test, the prototype's accuracy with motion was evaluated. Four hundred experimental trials were performed, each time varying the speed at which an RFID tag moves. The speed was varied by attaching the RFID tag to a mobile Roomba® robot whose speed may be controlled. Even at speeds of 50 cm/s, which is the maximum speed of the Roomba® robot employed in this test, the prototype's error remains under 2 centimeters. This may be due to three reasons: First, the prototype has low latency and high frame rates. Second, the prototype is resilient to multipath due to its larger bandwidth. And lastly, the prototype's Bayesian framework boosts its accuracy and robustness.

The prototype described in the preceding 12 paragraphs is a non-limiting example of this invention. This invention may be implemented in many different ways, and the performance (e.g., accuracy for a static object, latency, and accuracy with motion) of the invention may vary depending on, among other things, the particular implementation of this invention and the conditions in which the invention is employed.

More Details

This invention is not limited to detecting position of battery-free RFID tags that are wirelessly powered by an RFID reader. This invention may be employed to detect the position or trajectory of any backscatter node or of any other source of RF radiation. For instance, this invention may be employed to detect the location of battery-assisted or solar-powered RFID tags. Battery-assisted or solar-powered RFID tags may enable communication over relatively long distances. For instance, such tags may be attached to nano-drones or robotic arms to track the robots themselves over tens to hundreds of meters and not just the items they manipulate.

In some cases, the wideband signal transmitted or received by the wideband transceiver(e.g., 202 or 301) is an OFDM signal that includes multiple subcarriers. (Recall that the wideband transceiver is sometimes called a localization helper herein.) In other cases, the wideband signal is a spread spectrum signal, such as an CDMA (code-division multiple access) signal, SSMA (spread spectrum multiple access) signal or a DSSS (direct-sequence spread spectrum) signal.

In presence of multipath, the LS may employ a large bandwidth to obtain "'sanitized phases" by projecting on the direct path after identifying it.

In some implementations, this invention comprises one or more computer that are programmed to perform one or more of the Computer Tasks (as defined herein), including performing any localization algorithm described herein.

In some implementations, this invention comprises one or more machine readable media, with instructions encoded thereon for one or more computers to perform one or more of the Computer Tasks, including performing any localization algorithm described herein.

In some implementations, this invention comprises participating in a download of software, where the software comprises instructions for one or more computers to perform one or more of the Computer Tasks, including performing any localization algorithm described herein. For instance, the participating may comprise (a) a computer providing the software during the download, or (b) a computer receiving the software during the download.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a localization system, including any RFID reader, wideband transceiver, or localization helper; (2) to estimate channels; (3) to perform a localization algorithm; (4) to receive data from, control, or interface with one or more sensors; (5) to perform any other calculation, computation, program, algorithm, or computer function described or implied herein; (6) to receive signals indicative of human input; (7) to output signals for controlling transducers for outputting information in human perceivable format; (8) to process data, to perform computations, and to execute any algorithm or software; and (9) to control the read or write of data to and from memory devices (tasks 1-9 of this sentence referred to herein as the "Computer Tasks"). The one or more computers may, in some cases, communicate with each other or with other devices: (a) wirelessly, (b) by wired connection, (c) by fiber-optic link, or (d) by a combination of wired, wireless or fiber optic links. The one or more computers may include, for instance, controller 203 and computer 220 and may also include computers that are housed in, or that are components of, RFID reader 201, wideband transceiver 202, wideband transceiver 301, transmitter 401 or receiver 403.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 201, 202, 210, 211, 212, 220, 301, 401, 403) are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTE (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

Backscatter node" means an object that backscatters a radio signal. A non-limiting example of a "backscatter node" is an RFID tag that backscatters an RF signal.

To compute "based on" specified data means to perform a computation that takes the specified data as an input.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer".

"Computer Tasks" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

To say that X differs from Y "in that" Z means that X differs from Y in at least the aspect of Z. For instance, to say that Bob differs from Joe "in that" they have different color hair means that Bob and Joe differ in their hair color and may differ in other aspects also.

To say that a frequency range is "large" means that the frequency range is at least ten megahertz.

"Largeband signal" means an RF signal that comprises a set of one or more signals, which set of one or more signals (a) consists of a single signal or consists of signals that are simultaneous with each other, and (b) has a frequency range of at least ten megahertz, which range is from (i) the highest 3 dB cutoff frequency of any signal in the set of one or more signals to (ii) the lowest 3 dB cutoff frequency of any signal in the set of one or more signals. To be clear, we note that, as used in the preceding sentence, "frequency range" does not mean a range of frequencies through which a signal may vary over time.

"Localization system" or "LS" means a system that is configured to detect 1D, 2D, or 3D position of an object.

"Or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

A "portion" of X means part or all of X.

"Radio band" means the frequency band from 3 hertz to 3 terahertz.

"RFID" means radio frequency identification.

"RF transmitter" means a transmitter configured to transmit a wireless RF signal. A non-limiting example of an "RF transmitter" is a transceiver that is configured to transmit a wireless RF signal.

"RF receiver" means a receiver configured to receive a wireless RF signal. A non-limiting example of an "RF receiver" is a transceiver that is configured to receive a wireless RF signal.

"RF signal" means a signal that has a global maximum of spectral density in the radio band.

As used herein, the term "set" does not include a group with no elements.

Unless the context clearly indicates otherwise, "some" means one or more.

Non-limiting examples of a "source" of RF signals are: (a) a RF transmitter; (b) a reflector that is configured to reflect RF signals; and (c) a backscatter node that is configured to backscatter RF signals.

As used herein, a "subset" of a set consists of less than all of the elements of the set.

The term "such as" means for example.

"Transitioning between" a first state and a second state means transitioning from the first state to the second state or transitioning from the second state to the first state.

To say that a machine-readable medium is "transitory" means that the medium is a transitory signal, such as an electromagnetic wave.

"1D" means one-dimensional.

"2D" means two-dimensional.

"3D" means three-dimensional.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a system comprising: (a) one or more radio frequency (RF) transmitters; (b) one or more RF receivers; and (c) one or more computers; wherein (i) the one or more transmitters are configured to wirelessly transmit a largeband signal in such a way that the largeband signal travels from the one or more transmitters to a backscatter node, reflects from the backscatter node and travels to the one or more RF receivers, (ii) the one or more RF receivers are each configured to take measurements of the largeband signal, (iii) the one or more computers are programmed (A) to identify, based on the measurements, when the backscatter node is in a first reflective state and when the backscatter node is in a second reflective state, the first reflective state differing from the second reflective state in that a reflection response of the backscatter node is different in the first reflective state than in the second reflective state, which reflection response is phase or amplitude of RF reflection from the backscatter node as a function of RF radiation incident on the backscatter node, or (B) to identify, based on the measurements, when the backscatter node is transitioning between the first and second reflective states, and (iv) the one or more computers are further programmed to calculate estimates of phase or amplitude of the largeband signal for each frequency band in a set of multiple frequency bands of the largeband signal, which estimates are based on a portion of the measurements, which portion of the measurements is taken when the backscatter node is in the first reflective state or in the second reflective state and is not taken when the backscatter node is transitioning between the first and second reflective states. In some cases, the one or more computers are programmed to determine a one-dimensional, two-dimensional or three-dimensional position of the backscatter node, based on the estimates of phase or amplitude. In some cases: (a) the system further includes an additional transmitter, which additional transmitter is configured to transmit an additional signal; and (b) the system is configured to transmit the largeband signal in such a way that the largeband signal reflects from the backscatter node while the reflection response of the backscatter node is modulated by the backscatter node in response to the additional signal. In some cases, the one or more computers are programmed to cause the one or more transmitters to transmit the largeband signal in such a way that transmitting the largeband signal comprises orthogonal frequency-division multiplexing. In some cases, the one or more computers are programmed: (a) to cause the one or more transmitters to transmit the largeband signal in such a way that transmitting the largeband signal comprises orthogonal frequency-division multiplexing (OFDM); and (b) to compute, for each specific frequency band in the set of frequency bands, an average phase and average amplitude, by subtracting a first average phase from a second average phase and by subtracting a first average amplitude from a second average amplitude, where (i) the first average phase and first average amplitude are average phase and average amplitude, respectively, for the specific frequency band as measured by the one or more receivers during OFDM symbols that occur only while the backscatter node is in a non-reflective state, and (ii) the second average phase and second average amplitude are average phase and average amplitude, respectively, for the specific frequency band as measured by the one or more receivers during OFDM symbols that occur only while the backscatter node is in a reflective state. In some cases: (a) the system further comprises a radio frequency identification (RFID) reader; and (b) the backscatter node is an RFID tag. In some cases, the one or more RF transmitters transmit a set of orthogonal frequency-division multiplexing (OFDM) symbols in such a way that: (a) each OFDM symbol has a duration; and (b) the duration is sufficiently short that each OFDM symbol in a subset of the set of OFDM symbols (i) occurs only while the backscatter node remains in the first reflective state or remains in the second reflective state, and (ii) does not occur while the backscatter node is transitioning between the first and second reflective states. In some cases: (a) the system further comprises a radio frequency identification (RFID) reader; (b) the backscatter node is an RFID tag; (c) the RFID tag is configured to transmit a preamble to an RFID communication; and (d) the one or more computers are programmed (i) to compute, for each specific time segment in a set of time segments, a correlation between (A) a subset of the measurements, which subset was taken during the specific time segment, and (B) data that encodes the preamble and that was stored in memory, (ii) to identify, as a calculated window for the preamble, a time segment for which the correlation is at least as great as that for any other time segment in the set of time segments, (iii) to determine, based on a switching rate of the RFID tag and on timing of the calculated window for the preamble, a set of transition time intervals in which the RFID tag is transitioning between the first and second reflective states, and (iv) to disregard the set of transition time intervals, when estimating the position. Each of the cases described above in this paragraph is an example of the system described in the first sentence of this paragraph, and is also an example of an embodiment of this invention that may be combined with other embodiments of this invention.

In some implementations, this invention is a system comprising: (a) one or more radio frequency (RF) receivers that are configured to receive a largeband signal; and (b) one or more computers; wherein the one or more computers are programmed to perform an estimation, which estimation includes (i) calculating estimates of phase or amplitude of the largeband signal for each frequency band in a set of multiple frequency bands of the largeband signal, which estimates are based on measurements (A) taken by the one or more RF receivers during a set of multiple time periods in such a way that measurements for each time period in the set of time periods are separate from measurements for each other time period in the set of time periods, or (B) taken at a set of multiple receiver antennas of the one or more RF receivers in such a way that measurements taken at each antenna in the set of antennas are separate from measurements taken at each other antenna, if any, in the set of antennas, (ii) identifying, based on bandwidth of the largeband signal, a maximum distance and a minimum distance, (iii) identifying, based on the estimates of phase or amplitude, a set of most likely candidate distances, in such a way that (A) each candidate distance in the set of candidate distances is a discrete value, is greater than or equal to the minimum value and is less than or equal to the maximum value, and (B) the set of candidate distances includes, for each specific antenna in the set of one or more antennas, multiple candidate distances between the specific receiver antenna and an RF source of the largeband signal, and (iv) estimating, based on the set of candidate distances, a one-dimensional, two-dimensional or three-dimensional position of the RF source. In some cases, the estimation includes performing Bayesian inference. In some cases, the one or more computers are further programmed to perform modeling, which modeling: (a) is based on the set of estimates of phase or amplitude; and (b) models a probability distribution of the candidate distances as a mixture of gaussians, where each gaussian is centered at a different integer multiple of a wavelength. In some cases, the estimation includes solving a Hidden Markov Model. In some cases, at least a subset of the measurements are gaussian related to each other over time. In some cases, the estimation includes solving a maximum a posteriori problem to estimate a Hidden Markov Model. In some cases, the estimation involves solving a maximum a posteriori problem by performing approximate inference, which approximate inference includes a particle filter. In some cases, the estimation includes: (a) identifying (i) a set of ellipses that includes, for each specific receiver antenna in the set of receiver antennas, ellipses that each have foci, which foci are the specific receiver antenna and a transmitter antenna, and (ii) a set of most likely points of intersection between ellipses in the set of ellipses; or (b) identifying (i) a set of ellipsoids that includes, for each specific receiver antenna in the set of receiver antennas, ellipsoids that each have foci, which foci are the specific receiver antenna and a transmitter antenna, and (ii) a set of most likely points of intersection between ellipsoids in the set of ellipsoids. In some cases, the estimation includes: (a) identifying a set of ellipses that includes, for each specific receiver antenna in the set of receiver antennas, ellipses that each have foci, which foci are the specific receiver antenna and a transmitter antenna; (b) identifying a set of most likely points of intersection between ellipses in the set of ellipses; and (c) estimating, based on the measurements, a first subset of n intersection points in the set of most likely intersection points, where the sum of pairwise distances between intersection points in the first subset is less than or equal to the sum of pairwise distances between intersection points in any other subset of n intersection points in the set of most likely intersection points. In some cases: (a) the estimation involves performing an approximate inference that comprises a particle filter; and (b) the particle filter includes updating particles by sequential importance sampling, to update for new measurements of the largeband signal. In some cases, the one or more computers are further programmed to replace each outlier estimate, in a set of outlier estimates of position, with an interpolated estimate of position, which interpolated estimate is interpolated from a previous position. Each of the cases described above in this paragraph is an example of the system described in the first sentence of this paragraph, and is also an example of an embodiment of this invention that may be combined with other embodiments of this invention.

In some implementations, this invention is a system comprising: (a) one or more radio frequency (RF) transmitters; (b) one or more RF receivers; and (c) one or more computers; wherein (i) the one or more transmitters are configured to wirelessly transmit a largeband signal in such a way that the largeband signal travels from the one or more transmitters to a backscatter node, reflects from the backscatter node and travels to the one or more RF receivers, (ii) the system is configured to take measurements of the largeband signal at each of multiple receiver antennas of the one or more RF receivers, (iii) the one or more computers are programmed (A) to identify, based on the measurements, when the backscatter node is in a first reflective state and when the backscatter node is in a second reflective state, the first reflective state differing from the second reflective state in that a reflection response of the backscatter node is different in the first reflective state than in the second reflective state, which reflection response is phase or amplitude of RF reflection from the backscatter node as a function of RF radiation incident on the backscatter node, or (B) to identify, based on the measurements, when the backscatter node is transitioning between the first and second reflective states, and (iv) the one or more computers are further programmed (A) to calculate estimates of phase or amplitude of the largeband signal for each frequency band in a set of multiple frequency bands of the largeband signal, which estimates are based a portion of the measurements, which portion of the measurements is taken when the backscatter node is in the first reflective state or in the second reflective state and is not taken when the backscatter node is transitioning between the first and second reflective states, (B) to identify, based on bandwidth of the largeband signal, a maximum distance and a minimum distance, (C) to identify, based on the estimates of phase or amplitude, a set of most likely candidate distances, in such a way that (I) each candidate distance in the set of candidate distances is a discrete value, is greater than or equal to the minimum value and is less than or equal to the maximum value, and (II) the set of candidate distances includes, for each specific antenna in the set of one or more antennas, multiple candidate distances between the specific receiver antenna and an RF source of the largeband signal, and (D) to estimate, based on the set of candidate distances, a one-dimensional, two-dimensional or three-dimensional position of the RF source. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

Unless the context clearly indicates otherwise, each signal described above (including each wideband signal) may comprise a largeband signal.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising:
   (a) wirelessly transmitting, by orthogonal frequency-division multiplexing (OFDM), a largeband signal in such a way that the largeband signal travels from one or more transmitters to a backscatter node, reflects from the backscatter node and travels to one or more RF receivers;
   (b) taking measurements, with the one or more RF receivers, of the largeband signal;
   (c) identifying, based on the measurements,
      (i) when the backscatter node is in a first reflective state and when the backscatter node is in a second reflective state, the first reflective state differing from the second reflective state in that a reflection response of the backscatter node is different in the first reflective state than in the second reflective state, which reflection response is phase or amplitude of RF reflection from the backscatter node as a function of RF radiation incident on the backscatter node, or
      (ii) when the backscatter node is transitioning between the first and second reflective states;
   (d) calculating estimates of phase or amplitude of the largeband signal for each frequency band in a set of multiple frequency bands of the largeband signal, which estimates are based on a portion of the measurements, which portion of the measurements is taken when the backscatter node is in the first reflective state or in the second reflective state and is not taken when the backscatter node is transitioning between the first and second reflective states; and
   (e) calculating, for each specific frequency band in the set of frequency bands, an average phase and average amplitude, by subtracting a first average phase from a second average phase and by subtracting a first average amplitude from a second average amplitude, where (i) the first average phase and first average amplitude are average phase and average amplitude, respectively, for the specific frequency band as measured by the one or more receivers during OFDM symbols that occur only while the backscatter node is in a non-reflective state, and (ii) the second average phase and second average amplitude are average phase and average amplitude, respectively, for the specific frequency band as measured by the one or more receivers during OFDM symbols that occur only while the backscatter node is in a reflective state.

2. A method comprising:
   (a) wirelessly transmitting a largeband signal in such a way that the largeband signal travels from one or more transmitters to a backscatter node, reflects from the backscatter node and travels to one or more RF receivers;
   (b) taking measurements, with the one or more RF receivers, of the largeband signal;
   (c) identifying, based on the measurements,
      (i) when the backscatter node is in a first reflective state and when the backscatter node is in a second reflective state, the first reflective state differing from the second reflective state in that a reflection response of the backscatter node is different in the first reflective state than in the second reflective state, which reflection response is phase or amplitude of RF reflection from the backscatter node as a function of RF radiation incident on the backscatter node, or
      (ii) when the backscatter node is transitioning between the first and second reflective states; and
   (d) calculating estimates of phase or amplitude of the largeband signal for each frequency band in a set of multiple frequency bands of the largeband signal, which estimates are based on a portion of the measurements, which portion of the measurements is taken when the backscatter node is in the first reflective state or in the second reflective state and is not taken when the backscatter node is transitioning between the first and second reflective states;
   wherein the transmitting of the largeband signal involves transmitting a set of orthogonal frequency-division multiplexing (OFDM) symbols in such a way that (i) each OFDM symbol has a duration, and (ii) the duration is sufficiently short that each OFDM symbol in a subset of the set of OFDM symbols (A) occurs only while the backscatter node remains in the first reflective state or remains in the second reflective state, and (B) does not occur while the backscatter node is transitioning between the first and second reflective states.

3. A method comprising:
   (a) wirelessly transmitting a largeband signal in such a way that the largeband signal travels from one or more transmitters to a radio frequency identification (RFID) tag, reflects from the RFID tag and travels to one or more RF receivers;
   (b) taking measurements, with the one or more RF receivers, of the largeband signal;
   (c) identifying, based on the measurements
      (i) when the RFID tag is in a first reflective state and when the RFID tag is in a second reflective state, the first reflective state differing from the second reflective state in that a reflection response of the RFID tag is different in the first reflective state than in the second reflective state, which reflection response is phase or amplitude of RF reflection from the RFID tag as a function of RF radiation incident on the RFID tag, or
      (ii) when the RFID tag is transitioning between the first and second reflective states;
   (d) calculating estimates of phase or amplitude of the largeband signal for each frequency band in a set of multiple frequency bands of the largeband signal, which estimates are based on a portion of the measurements, which portion of the measurements is taken when the RFID tag is in the first reflective state or in the second reflective state and is not taken when the RFID tag is transitioning between the first and second reflective states;
   (e) transmitting, from the RFID tag, a preamble to an RFID communication;
   (f) computing, for each specific time segment in a set of time segments, a correlation between (i) a subset of the measurements, which subset was taken during the specific time segment, and (ii) data that encodes the preamble and that was stored in memory;
   (g) identifying, as a calculated window for the preamble, a time segment for which the correlation is at least as great as that for any other time segment in the set of time segments;
   (h) determining, based on a switching rate of the RFID tag and on timing of the calculated window for the preamble, a set of transition time intervals in which the RFID tag is transitioning between the first and second reflective states; and
(i) disregarding the set of transition time intervals, when estimating a one-dimensional, two-dimensional or three-dimensional position of the RFID tag.

4. A method comprising:
(a) receiving, with one or more radio frequency (RF) receivers, a largeband signal; and
(b) performing an estimation, which estimation includes
(i) calculating estimates of phase or amplitude of the largeband signal for each frequency band in a set of multiple frequency bands of the largeband signal, which estimates are based on measurements taken at a set of receiver antennas of the one or more RF receivers in such a way that measurements taken at each receiver antenna in the set of receiver antennas are separate from measurements taken at each other receiver antenna in the set of receiver antennas,
(ii) identifying, based on bandwidth of the largeband signal, a maximum distance and a minimum distance,
(iii) identifying, based on the estimates of phase or amplitude, a set of most likely candidate distances, in such a way that
(A) each candidate distance in the set of candidate distances is a discrete value, is greater than or equal to the minimum value and is less than or equal to the maximum value, and
(B) the set of candidate distances includes, for each specific receiver antenna in the set of receiver antennas, multiple candidate distances between the specific receiver antenna and an RF source of the largeband signal, and
(iv) estimating, based on the set of candidate distances, a one-dimensional, two-dimensional or three-dimensional position of the RF source.

5. The method of claim 4, wherein the estimation includes performing Bayesian inference.

6. The method of claim 4, wherein the method further comprises modeling that:
(a) is based on the estimates of phase or amplitude; and
(b) models a probability distribution of the candidate distances as a mixture of gaussians, where each gaussian is centered at a different integer multiple of a wavelength.

7. The method of claim 4, wherein the estimation includes solving a Hidden Markov Model.

8. The method of claim 4, wherein at least a subset of the measurements are gaussian related to each other over time.

9. The method of claim 4, wherein the estimation includes solving a maximum a posteriori problem to estimate a Hidden Markov Model.

10. The method of claim 4, wherein the estimation involves solving a maximum a posteriori problem by performing approximate inference, which approximate inference includes a particle filter.

11. The method of claim 4, wherein the estimation includes:
(a) identifying
(i) a set of ellipses that includes, for each specific receiver antenna in the set of receiver antennas, ellipses that each have foci, which foci are the specific receiver antenna and a transmitter antenna, and
(ii) a set of most likely points of intersection between ellipses in the set of ellipses; or (b) identifying
(i) a set of ellipsoids that includes, for each specific receiver antenna in the set of receiver antennas, ellipsoids that each have foci, which foci are the specific receiver antenna and a transmitter antenna, and
(ii) a set of most likely points of intersection between ellipsoids in the set of ellipsoids.

12. The method of claim 4, wherein the estimation includes:
(a) identifying a set of ellipses that includes, for each specific receiver antenna in the set of receiver antennas, ellipses that each have foci, which foci are the specific receiver antenna and a transmitter antenna;
(b) identifying a set of most likely points of intersection between ellipses in the set of ellipses; and
(c) estimating, based on the measurements, a first subset of n intersection points in the set of most likely intersection points, where the sum of pairwise distances between intersection points in the first subset is less than or equal to the sum of pairwise distances between intersection points in any other subset of n intersection points in the set of most likely intersection points.

13. The method of claim 4, wherein:
(a) the estimation involves performing an approximate inference that comprises a particle filter; and
(b) the particle filter includes updating particles by sequential importance sampling, to update for new measurements of the largeband signal.

14. The method of claim 4, wherein the estimation further comprises replacing each outlier estimate, in a set of outlier estimates of position, with an interpolated estimate of position, which interpolated estimate is interpolated from a previous position.

15. A method comprising:
(a) wirelessly transmitting a largeband signal in such a way that the largeband signal travels from one or more transmitters to a backscatter node, reflects from the backscatter node and travels to one or more RF receivers;
(b) taking measurements of the largeband signal at a set of receiver antennas of the one or more RF receivers;
(c) identifying, based on the measurements,
(i) when the backscatter node is in a first reflective state and when the backscatter node is in a second reflective state, the first reflective state differing from the second reflective state in that a reflection response of the backscatter node is different in the first reflective state than in the second reflective state, which reflection response is phase or amplitude of RF reflection from the backscatter node as a function of RF radiation incident on the backscatter node, or
(ii) when the backscatter node is transitioning between the first and second reflective states;
(d) calculating estimates of phase or amplitude of the largeband signal for each frequency band in a set of multiple frequency bands of the largeband signal, which estimates are based a portion of the measurements, which portion of the measurements is taken when the backscatter node is in the first reflective state or in the second reflective state and is not taken when the backscatter node is transitioning between the first and second reflective states;
(e) identifying, based on bandwidth of the largeband signal, a maximum distance and a minimum distance;

(f) identifying, based on the estimates of phase or amplitude, a set of most likely candidate distances, in such a way that
   (i) each candidate distance in the set of candidate distances is a discrete value, is greater than or equal to the minimum value and is less than or equal to the maximum value, and
   (ii) the set of candidate distances includes, for each specific receiver antenna in the set of receiver antennas, multiple candidate distances between the specific receiver antenna and an RF source of the largeband signal; and (g) estimating, based on the set of candidate distances, a one-dimensional, two-dimensional or three-dimensional position of the RF source.

* * * * *